(12) United States Patent
Ochi et al.

(10) Patent No.: US 9,134,408 B2
(45) Date of Patent: Sep. 15, 2015

(54) APPARATUS AND METHOD FOR TRAFFIC LANE DETECTION

(71) Applicant: FUJITSU LIMITED, Kawasaki-shi (JP)

(72) Inventors: Mitsuru Ochi, Kawasaki (JP); Junko Kajiki, Kawasaki (JP); Tomonori Ikeya, Sagamihara (JP); Kazuhiko Shite, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 291 days.

(21) Appl. No.: 13/742,132

(22) Filed: Jan. 15, 2013

(65) Prior Publication Data

US 2013/0214962 A1 Aug. 22, 2013

(30) Foreign Application Priority Data

Feb. 22, 2012 (JP) .................................. 2012-036831

(51) Int. Cl.
*G01S 13/66* (2006.01)
*G01S 13/58* (2006.01)
*G01S 13/87* (2006.01)

(52) U.S. Cl.
CPC ............... *G01S 13/58* (2013.01); *G01S 13/878* (2013.01)

(58) Field of Classification Search
CPC ......... G01S 13/52; G01S 13/66; G01S 13/91; G08G 1/015; G08G 1/017; G08G 1/0125; G08G 1/096783; G06K 9/00785; G06K 9/3241
USPC ........................................................ 342/109
See application file for complete search history.

(56) References Cited

U.S. PATENT DOCUMENTS

| | | | |
|---|---|---|---|
| 4,985,705 A * | 1/1991 | Stammler | 342/69 |
| 6,025,799 A | 2/2000 | Ho et al. | |
| 2003/0067396 A1* | 4/2003 | Hassett | 340/825.49 |
| 2006/0269104 A1* | 11/2006 | Ciolli | 382/104 |

FOREIGN PATENT DOCUMENTS

| | | |
|---|---|---|
| JP | 4-127078 A | 4/1992 |
| JP | 11-86183 | 3/1999 |

(Continued)

OTHER PUBLICATIONS

Extended European Search Report dated May 7, 2013 for corresponding European Application No. 13151560.3.

(Continued)

*Primary Examiner* — Timothy A Brainard
(74) *Attorney, Agent, or Firm* — Fujitsu Patent Center

(57) ABSTRACT

Two radar devices are installed for adjacent lanes. A memory sequentially stores a received power value at a time when the two radar devices receive the reflected wave from a vehicle at specified time intervals. A calculator calculates, when a vehicle moves in a direction approaching the two radar devices, as a representative value of the received power at a specified time, a weighted average value when weights, which become heavier as an acquisition time of the received power value becomes farther from the specified time, are assigned to a specified number of received power values, whose acquisition time is prior to a specified time, where a priority is given to the received power values whose acquisition time is close to the specified time. A discriminator determines a lane in which the vehicle is traveling according to a result of comparing the sizes of the calculated representative value.

15 Claims, 19 Drawing Sheets

(56) References Cited

FOREIGN PATENT DOCUMENTS

| | | |
|---|---|---|
| JP | 2000-048296 | 2/2000 |
| JP | 2005-182256 A | 7/2005 |
| JP | 2011-196885 | 10/2011 |

OTHER PUBLICATIONS

Japanese Office Action mailed Jun. 30, 2015 for corresponding Japanese Patent Application No. 2012-036831, with Partial English Translation.

* cited by examiner

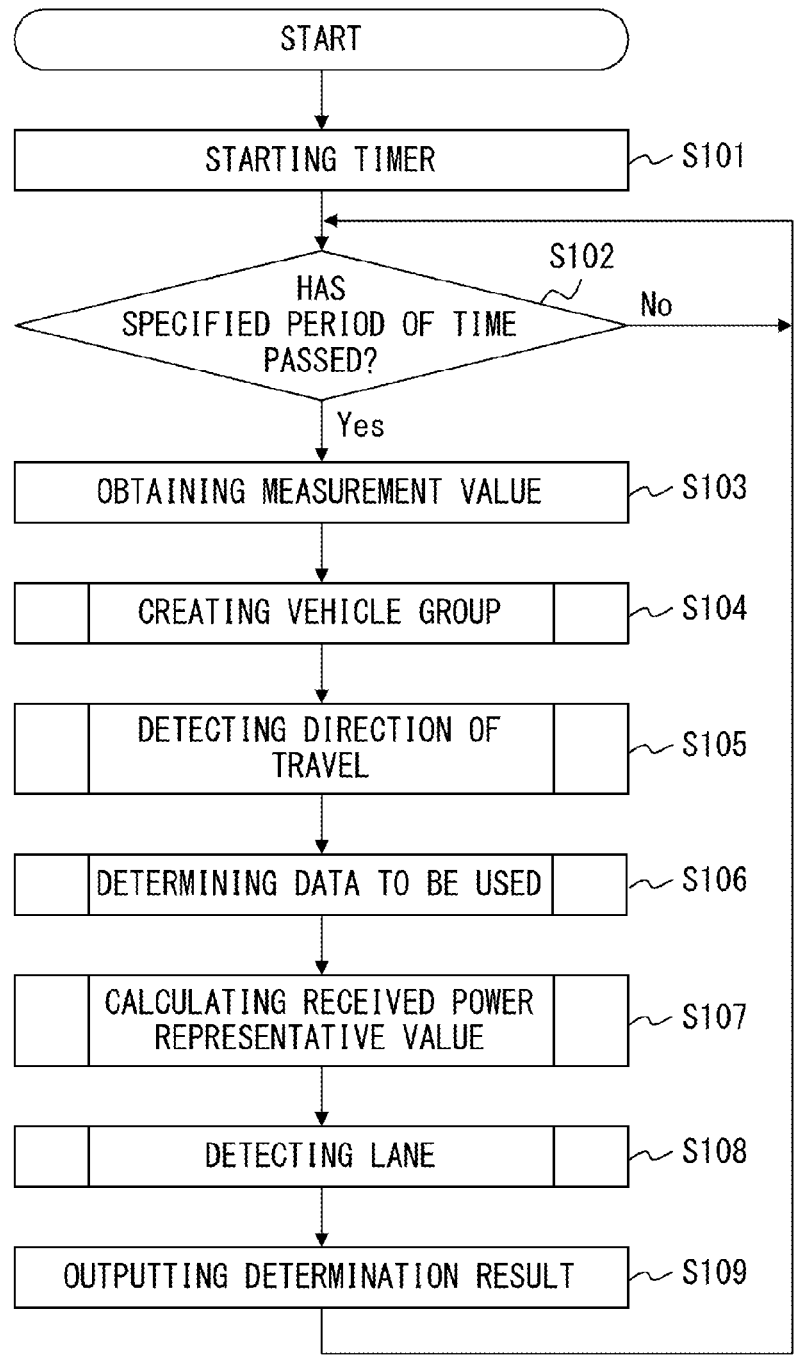
F I G. 5

DETECTION INFORMATION TABLE 51a

| TIME | DISTANCE (m) | SPEED (km/h) | POWER (dBmV) |
|------|--------------|--------------|--------------|
| T1   | R11[1]       | V11[1]       | P11[1]       |
| T1   | R12[1]       | V12[1]       | P12[1]       |

F I G. 6 A

DETECTION INFORMATION TABLE 51b

| TIME | DISTANCE (m) | SPEED (km/h) | POWER (dBmV) |
|------|--------------|--------------|--------------|
| T1   | R21[1]       | V21[1]       | P21[1]       |

F I G. 6 B

| ID | TIME | DISTANCE (m) | SPEED (km/h) | POWER (dBmV) | | DIREC-TION | LANE |
|---|---|---|---|---|---|---|---|
| | | | | RADAR a | RADAR b | | |
| ID1 | T0 | R1[0] | V1[0] | P11[0] | P12[0] | — | a |

INNER TABLE 52

F I G. 9

| ID | TIME | DISTANCE (m) | SPEED (km/h) | POWER (dBmV) | | DIREC-TION | LANE |
|---|---|---|---|---|---|---|---|
| | | | | RADAR a | RADAR b | | |
| ID1 | T0 | R1[0] | V1[0] | P11[0] | P12[0] | — | a |
| ID1 | T1 | R1[1] | V1[1] | P11[1] | P12[1] | UN-DEFINED | UN-DEFINED |
| ID2 | T1 | R2[1] | V2[1] | P21[1] | NONE | UN-DEFINED | UN-DEFINED |

INNER TABLE 52

FIG. 10

INNER TABLE 52

| ID | TIME | DISTANCE (m) | SPEED (km/h) | POWER (dBmV) | | DIREC-TION | LANE |
|---|---|---|---|---|---|---|---|
| | | | | RADAR a | RADAR b | | |
| ID1 | T0 | R1[0] | V1[0] | P11[0] | P12[0] | — | a |
| ID1 | T1 | R1[1] | V1[1] | P11[1] | P12[1] | — | UN-DEFINED |
| ID2 | T1 | R2[1] | V2[1] | P21[1] | NONE | — | UN-DEFINED |

F I G. 1 2

| ID | TIME | DISTANCE (m) | SPEED (km/h) | POWER (dBmV) | | DIREC-TION | LANE |
|---|---|---|---|---|---|---|---|
| | | | | RADAR a | RADAR b | | |
| ID1 | T1 | R1[1] | V1[1] | P11[1] | P12[1] | — | a |
| ID1 | T2 | R1[2] | V1[2] | P11[2] | P12[2] | — | a |
| ID1 | T3 | R1[3] | V1[3] | P11[3] | P12[3] | — | a |
| ID1 | T4 | R1[4] | V1[4] | P11[4] | P12[4] | — | a |
| ID1 | T5 | R1[5] | V1[5] | P11[5] | P12[5] | — | UNDEFINED |

INNER TABLE 52

F I G. 1 5

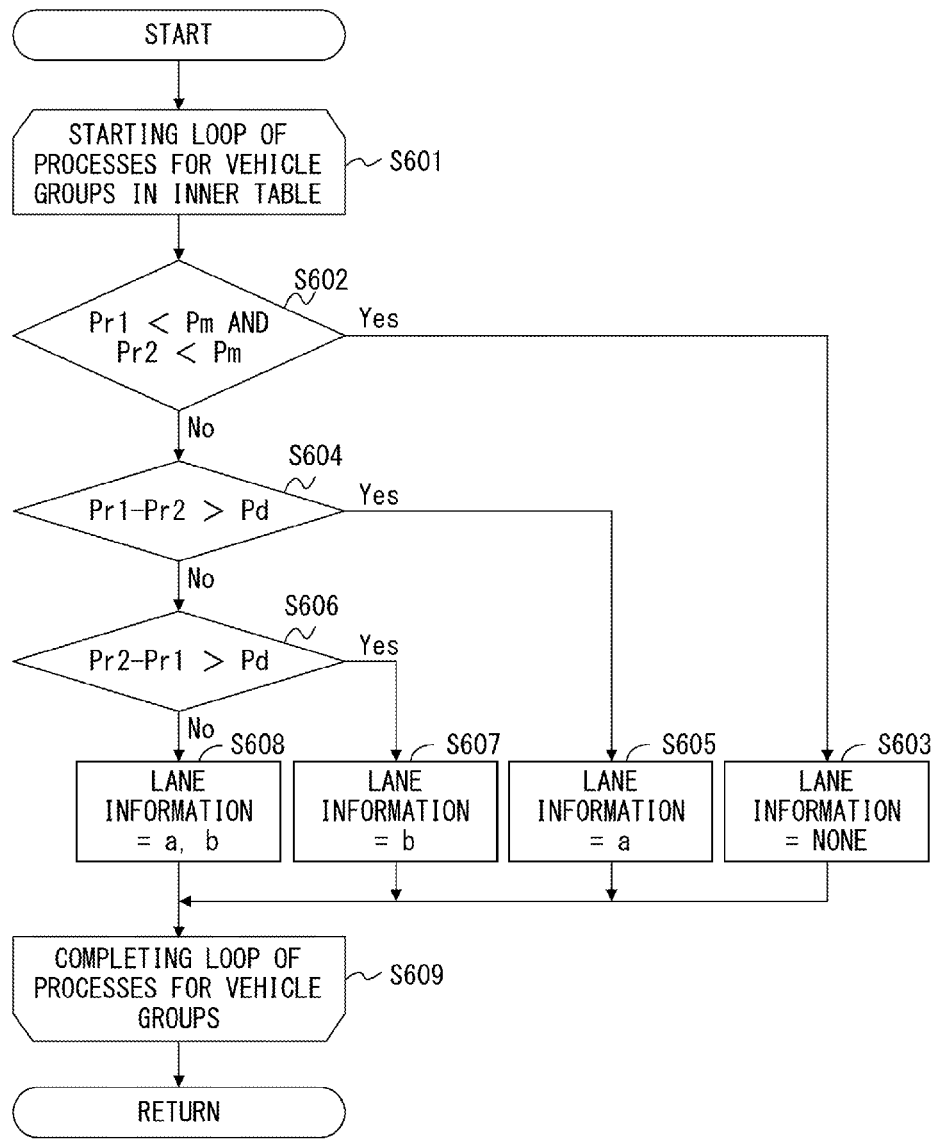
F I G. 1 6

INNER TABLE 52

| ID | TIME | DISTANCE (m) | SPEED (km/h) | POWER (dBmV) | | DIREC-TION | LANE |
|---|---|---|---|---|---|---|---|
| | | | | RADAR a | RADAR b | | |
| ID1 | ... | ... | ... | ... | ... | ... | ... |
| ID1 | Tn | 100 | -10 | 20 | 20 | — | UN-DEFINED |
| ID2 | ... | ... | ... | ... | ... | ... | ... |
| ID2 | Tn | 90 | -20 | 20 | 2 | — | UN-DEFINED |
| ID3 | ... | ... | ... | ... | ... | ... | ... |
| ID3 | Tn | 120 | -10 | 2 | 2 | — | UN-DEFINED |

F I G. 1 7

INNER TABLE 52

| ID  | TIME | DISTANCE (m) | SPEED (km/h) | POWER (dBmV) RADAR a | POWER (dBmV) RADAR b | DIRECTION | LANE |
|-----|------|--------------|--------------|----------------------|----------------------|-----------|------|
| ID1 | ...  | ...          | ...          | ...                  | ...                  | ...       | ...  |
| ID1 | Tn   | 100          | -10          | 20                   | 20                   | —         | a, b |
| ID2 | ...  | ...          | ...          | ...                  | ...                  | ...       | ...  |
| ID2 | Tn   | 90           | -20          | 20                   | 2                    | —         | a    |
| ID3 | ...  | ...          | ...          | ...                  | ...                  | ...       | ...  |
| ID3 | Tn   | 120          | -10          | 2                    | 2                    | —         | NONE |

FIG. 18

| LANE | DISTANCE (m) | SPEED (km/h) |
|------|--------------|--------------|
| a    | 100          | −10          |
| a    | 90           | −20          |
| b    | 100          | −10          |

FIG. 19

APPARATUS AND METHOD FOR TRAFFIC LANE DETECTION

CROSS-REFERENCE TO RELATED APPLICATION

This application is based upon and claims the benefit of priority of the prior Japanese Patent Application No. 2012-036831, filed on Feb. 22, 2012, the entire contents of which are incorporated herein by reference.

FIELD

The embodiments discussed herein are related to a technology in which the existence of an object is detected by using the reflection of radio waves.

BACKGROUND

It is desired that a situation on a road where vehicles are traveling be measured for each lane to detect the flow or speed of vehicles for each lane, such that a signal control or a patrol of vehicles will be improved or rear-end collision accidents will be prevented by providing successive vehicles with information.

As one technique that responds to such demands, a technique is known in which the traffic lane of a vehicle is identified by identifying the position of a vehicle on a polar coordinate system with the center being the position at which a radar device is installed, where radar devices capable of sweeping the irradiation directions of radar waves are used to sweep the radar waves along the road width. However, such sweeping radar devices have a disadvantage in durability and in the maintenance of sweeping angles in consideration of the fact that the devices are continuously used for a long period of time after the installation. For this reason, it is desirable that a situation in which vehicles are traveling be detected for each lane by using non-sweeping radar devices which are installed for each lane, i.e., radar devices capable of detecting the distance between the radar device and a vehicle as well as the traveling speed of a vehicle but not capable of detecting the existing direction of a vehicle.

As a first technique that responds to such demands, a technique is known in which the lane where the vehicle detected by a radar device is traveling is distinguished. This technique is provided for each of two or more lanes to detect a vehicle by using the information from two or more radar devices whose detection range includes a lane adjacent to the installed lane. In this technique, a detected distance indicating the distance between a detected object and the radar that detected the object as well as the received power from the object are acquired from each radar device. Next, cases are detected where the distance between a first object detected by a first radar out of the two or more radar devices and a second object detected by a second radar installed for the lane adjacent to the lane in which the first radar is installed is equal to or less than a threshold. Then, the radar device that acquired the larger received power therein from the first or second object is identified, and it is determined that the vehicle is traveling in the lane in which the identified radar device is installed.

Moreover, as a second technique that responds to the demands, a technique is known in which the occurrence of traffic congestion, traffic accidents, or the like on the road, or the behavior of an abnormal vehicle expected to cause traffic accidents, is detected. In this technique, two or more radar devices are used that are installed in each lane and that detect the intensity or spectrum of a signal reflected from a vehicle on a lane. In this technique, the intensity or spectrum of a signal reflected from a vehicle detected by the radar devices is used to calculate the position and speed of the subject vehicle in the lane direction. Here, when at least two radio radars out of the radio radars installed for each lane detect a reflected signal from the same traveling vehicle, such a vehicle is identified as the same vehicle. Next, the maximum value in the amplitude of a reflected signal from the same traveling vehicle identified as the same vehicle is obtained for each certain period of time determined in advance for each radar device, and the obtained maximum values are compared with each other, thereby estimating the lane in which the vehicle exists or the position in the road width direction. Accordingly, a two-dimensional position or behavior of a vehicle on the road is estimated on the basis of the above-obtained information of the position and speed of the two or more different vehicles in the lane direction as well as the position in the road width direction.

The coverage of radar devices used in the first and second techniques (the area of a position in which a vehicle exists where the radar wave emitted from the radar device is reflected and it is expected that the reflected wave from a vehicle at a received power greater than a threshold will be received by the radar device) has an elliptic shape rather than a rectangular shape. For this reason, if the detection range where it is expected that a vehicle will be detected by using a radar device is expanded to the full width of a lane in order to detect a vehicle traveling at an edge of the lane, even a portion of the lane next to the lane to be detected is included in the detection range.

FIG. 1 is a schematic diagram illustrating the relationship between the detection range of radar devices and lanes, where two radar devices 1a and 1b are installed for two adjacent lanes 2a and 2b, respectively. If detection ranges 3a and 3b of the respective radar devices 1a and 1b are expanded in the width direction of the lanes 2a and 2b, the radar device 1a would detect, near an overlapping detection range 4, even a vehicle that is traveling in the lane 2b next to the lane 2a in which the radar device 1a is installed. Moreover, the radar device 1b also detects a vehicle that is traveling in the lane 2a next to the lane 2b in which the radar device 1b is installed.

In view of such problems, in the aforementioned first and second techniques, the output values of the two radar devices that detect the respective adjacent lanes are compared with each other to determine in which of the adjacent lanes the vehicle is traveling.

Moreover, in the aforementioned first and second techniques, how the received power of the reflected wave of a radar wave from the same vehicle changes overtime is monitored in order to determine the traffic lane of a vehicle. In other words, in these techniques, the received power of a reflected wave from the same vehicle is tracked on a time-series basis.

As another background art, a technique is known that is not dependent on weather conditions or the like, and that measures the absolute positions of vehicles on wide areas of the road on a real time basis. In this technique, a radar transmitter that transmits a radar wave to a specified section on the road, and a radar receiver that receives the reflected wave of a radar wave transmitted from the radar transmitter are used. In this technique, the positions of vehicles on a coordinate system with reference to the ground including the surface of the road in the specified section are firstly obtained from the positions on the specified section of the road according to the reflected wave received at the radar receiver. Then, the obtained position information is transmitted by radio to vehicles that are traveling in the specified section, and is displayed on display devices on the road or on surveillance display devices.

Note that the techniques disclosed in the following documents are known.

Document 1: Japanese Laid-open Patent Publication No. 2011-196885

Document 2: Japanese Laid-open Patent Publication No. 2000-048296

Document 3: Japanese Laid-open Patent Publication No. 11-086183

The techniques of detecting a vehicle by using a radar device may be classified into backward detection and forward detection according to the difference in the position of a radar device with reference to the direction in which a vehicle is traveling. Backward detection and forward detection will be explained with reference to FIG. 2.

Backward detection is a technique in which a vehicle 5 in a detection range 3 traveling in a direction moving away from a radar device 1 (the direction indicated by an arrow) is detected by the radar device 1 from the rear of the vehicle 5. Moreover, forward detection is a technique in which the vehicle 5 in the detection range 3 traveling in a direction approaching the radar device 1 (the direction indicated by an arrow) is detected by the radar device 1 from the front of the vehicle 5.

In backward detection, the position at which the radar device 1 catches the vehicle 5 for the first time is a position closest to the radar device 1 in the detection range 3 of the radar device 1. Accordingly, a strong reflected wave is obtained from the vehicle at such a position, and a result of measuring the position of the vehicle 5 (distance from the radar device 1) and the speed of the vehicle 5 by the radar device 1 is expected to be highly accurate, and the reliability is high. Subsequently, as the distance from the radar device 1 becomes larger due to the movement of the vehicle 5, the resolution power of the measurement of distance or speed degrades. As the vehicle 5 moves away from the radar device 1, the intensity of the reflected wave also become weak, and the influence or the like of several types of noise or the reflected wave coming through a different path become relatively large. As a result, the accuracy of the measurement result degrades.

When the tracking of the received power of a reflected wave from the same vehicle 5 on a time-series basis is performed by using backward detection, the reflected wave at the time when the radar device 1 caught the vehicle for the first time is strong. Accordingly, it is possible to detect the traffic lane of the vehicle 5 according to the intensity of the reflected wave at a satisfactory level. As the reliability of the measurement result of the position and speed of the vehicle 5 at this stage is also high, the subsequent tracking of the vehicle 5 is relatively easy.

On the other hand, if the tracking is performed by using forward detection, the position at which the radar device 1 catches the vehicle 5 for the first time is a position furthest from the radar device 1 in the detection range 3 of the radar device 1. As the reflected wave from the vehicle 5 at this position is weak, the detection of the traffic lane of the vehicle 5 according to the intensity of the reflected wave may become difficult. Moreover, as the reliability of the measurement result of the position and speed of the vehicle 5 at this stage is also low, the subsequent tracking of the vehicle 5 will be difficult for a certain period of time.

As described above, when the vehicle 5 is detected by using the radar device 1, the backward detection is generally more advantageous than the forward detection. However, there are many cases where the vehicle 5 needs to be detected by using the forward detection due to some constraints on the position at which the radar device 1 is to be installed.

SUMMARY

According to an aspect of the embodiment, an apparatus includes a plurality of radar devices, a memory, a calculator, and a discriminator. A plurality of the radar devices are provided for each lane, whose detection range includes an installed lane and an adjacent lane adjacent to the installed lane, the radar devices detecting a vehicle by emitting a radar wave to the vehicle traveling in the lane and by receiving a reflected wave from the vehicle. The memory sequentially stores as a received power value an instantaneous value of a received power at a time when two radar devices installed for adjacent lanes out of the plurality of radar devices receive the reflected wave from a vehicle to be detected at specified time intervals. The calculator calculates, when the vehicle to be detected moves in a direction approaching the radar devices, as a representative value of a received power at a specified time in regard to each of the two radar devices, a weighted average value of the received power value when inverse weights, which become heavier as an acquisition time of the received power value becomes farther from the specified time, are assigned to a specified number of received power values stored in the memory according to a time at which the received power value is obtained, where an acquisition time of the received power values is prior to the specified time and a priority is given to the received power values whose acquisition time is close to the specified time. The discriminator compares sizes of representative values of the received power calculated by the calculator between the two radar devices, and determine a lane in which the vehicle to be detected is traveling according to the comparison result.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a flowchart illustrating the process of how a traffic lane is detected.

FIGS. 6A and B illustrate the structure of detection information tables.

FIG. 9 illustrates the structure of an inner table.

FIG. 10 depicts examples of the data in an inner table after the process of creating a vehicle group is completed.

FIG. 12 depicts examples of the data in an inner table after the process of detecting the direction of travel is completed.

FIG. 15 depicts examples of the data in an inner table, which is used for explaining the process of calculating a received power representative value.

FIG. 16 is a flowchart illustrating the process of how a lane is detected.

FIG. 17 depicts examples of the data in an inner table before the process of detecting a lane is started.

FIG. 18 depicts examples of the data in an inner table after the process of detecting a lane is completed.

FIG. 19 depicts an example of the output data from a traffic lane detection apparatus.

DESCRIPTION OF EMBODIMENTS

Preferred embodiments of the present invention will be explained with reference to accompanying drawings.

Figure 1:
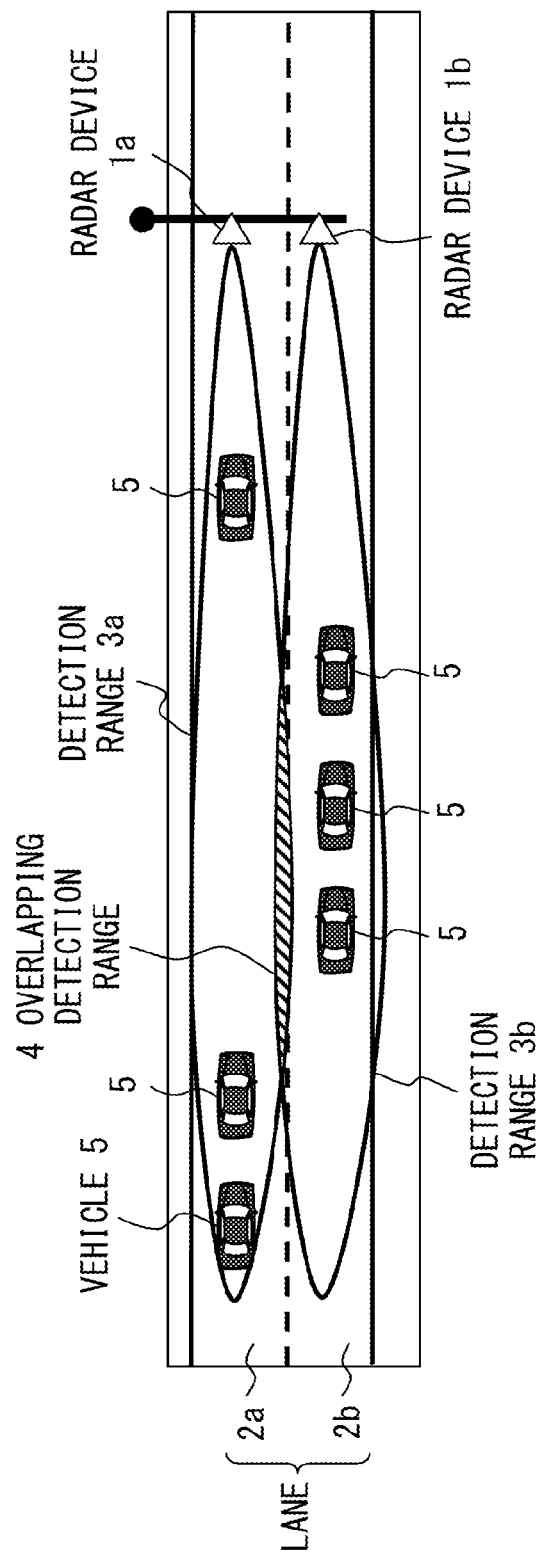
FIG. 1 is a schematic diagram illustrating the relationship between the detection range of radar devices and lanes.
Figure 2:
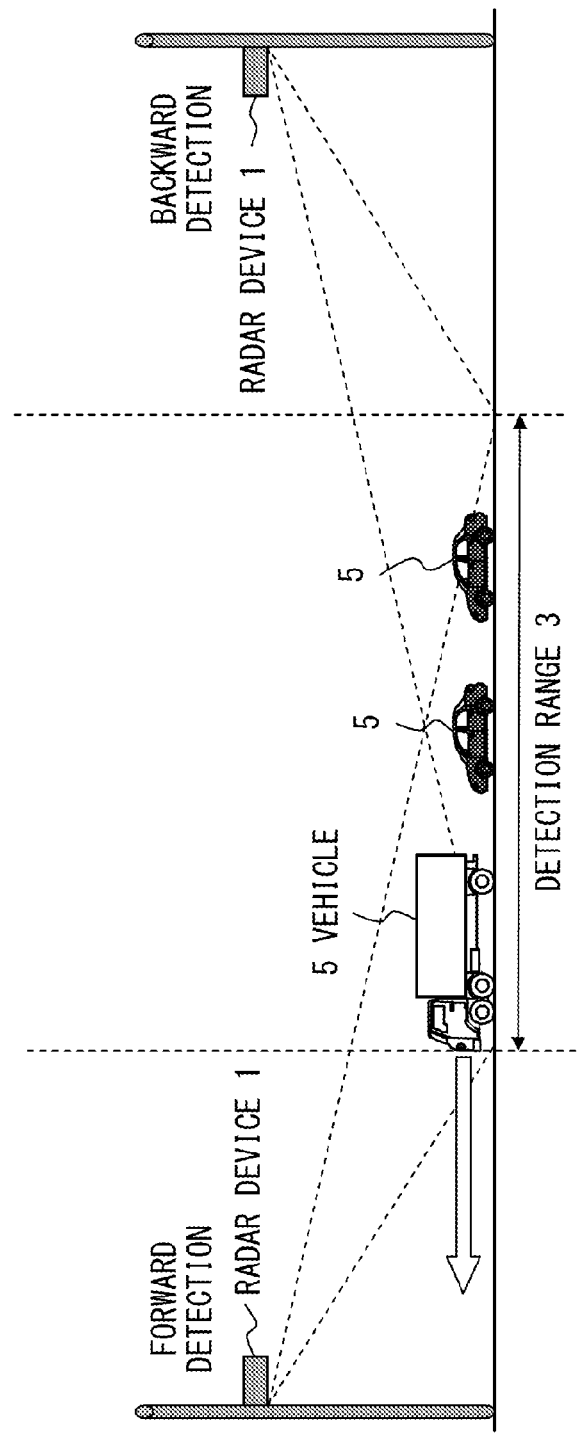
FIG. 2 illustrates backward detection and forward detection.
Figure 3:
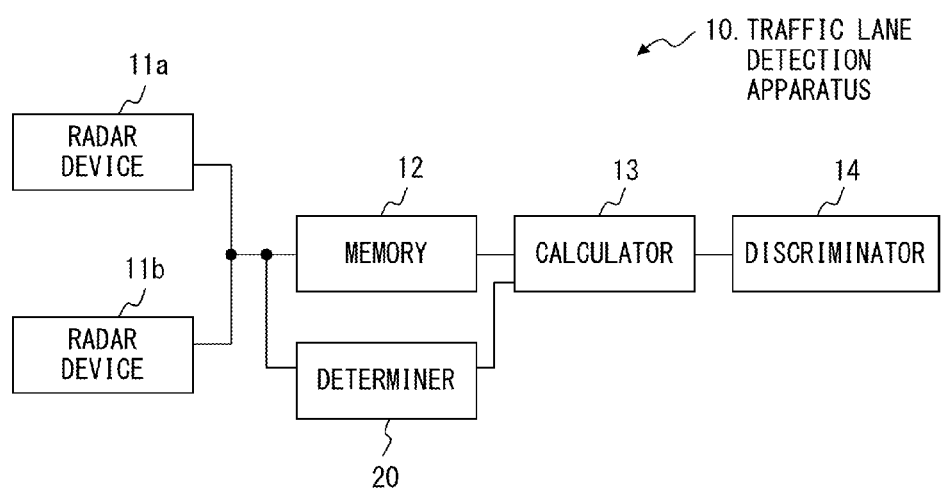
FIG. 3 is a functional block diagram illustrating the configuration of a traffic lane detection apparatus according to one embodiment.

Firstly, FIG. 3 will be explained. FIG. 3 is a functional block diagram illustrating the configuration of a traffic lane detection apparatus according to one embodiment.

In FIG. 3, a traffic lane detection apparatus 10 includes radar devices 11a and 11b, a memory 12, a calculator 13, and a discriminator 14. In the present embodiment, as illustrated in FIG. 3, the traffic lane detection apparatus 10 further includes a determiner 20.

The radar devices 11a and 11b are two of a plurality of radar devices, provided for each lane, whose detection range includes an installed lane and an adjacent lane adjacent to the installed lane, and the radar devices 11a and 11b are installed for adjacent lanes. The radar devices 11a and 11b detect a vehicle by emitting a radar wave to the vehicle traveling in the subject lane and by receiving a reflected wave from the vehicle.

The memory 12 sequentially stores as a received power value an instantaneous value of a received power at the time when each of the radar devices 11a and 11b receives a reflected wave from a vehicle to be detected at specified time intervals.

In regard to each of the two radar devices 11a and 11b, the calculator 13 calculates, as a representative value of the received power, a weighted average value of the received power value when weights are assigned to a specified number of received power values stored in the memory 12 according to the time at which the received power value is obtained. It is to be noted that when a vehicle to be detected moves in a direction approaching the radar devices 11a and 11b, the calculator 13 assigns inverse weights to a specified number of received power values whose acquisition time is prior to a specified time, where a priority is given to the received power values whose acquisition time is close to the specified time. The cases in which a vehicle to be detected moves in a direction approaching the radar devices 11a and 11b indicate a situation where the traffic lane detection apparatus 10 detects a lane in which a vehicle to be detected is traveling by using forward detection. In the inverse weighting, the weight becomes heavier as the acquisition time of the received power value becomes further from the specified time. The calculator 13 calculates, as a representative value of the received power at that specified time, a weighted average value of the received power value when such inverse weights are assigned.

The discriminator 14 compares the size of representative values of the received power calculated by the calculator 13 between the two radar devices 11a and 11b, and determines a lane in which a vehicle to be detected is traveling according to a comparison result.

Cases will be considered in which a weighted average value of the received power value when weights are assigned to a specified number of received power values according to the time at which the received power value is obtained is calculated as a representative value of the received power from a vehicle to be detected at a specified time. In general, the weights that are assigned to the specified number of received power values for the purpose of calculating the weighted average value are heavier as the acquisition time of the received power value comes closer to the specified time. Here, such weighting is referred to as "normal weighting".

In the already available apparatuses that detect a traffic lane, a representative value of the received power is calculated by using these normal weights, and the apparatuses are optimized to detect a traffic lane on the basis of the calculation result by using backward detection. For this reason, if the already available apparatuses that are optimized as above are used to detect a traffic lane by using forward detection, the detection accuracy significantly deteriorates.

By contrast, as described above, the traffic lane detection apparatus 10 of FIG. 3 is configured to calculate a representative value of the received power by using the above-mentioned inverse weights when forward detection is used. If such a configuration is adopted, the calculation accuracy of a representative value of the received power becomes approximately the same as that of the backward detection by the already available apparatuses. In other words, the traffic lane detection apparatus 10 may use forward detection to detect the traffic lane of a vehicle with an accuracy equivalent to when the already available apparatuses use backward detection to detect the traffic lane of a vehicle.

In the present embodiment, when a vehicle to be detected moves in a direction moving away from the radar devices 11a and 11b, the calculator 13 assigns the above-mentioned normal weights to a specified number of received power values whose acquisition time is prior to a specified time, where a priority is given to the received power values whose acquisition time is close to the specified time. Then, the calculator 13 calculates a weighted average value of the received power value to which these normal weights are assigned as a representative value of the received power at the specified time. The cases in which a vehicle to be detected moves in a direction moving away from the radar devices 11a and 11b indicate a situation where the traffic lane detection apparatus 10 detects a lane in which a vehicle to be detected is traveling by using backward detection.

By so doing, the traffic lane of a vehicle to be detected may be detected appropriately by either forward detection or backward detection.

In the present embodiment, the calculator 13 uses the same weights as a specified number of weights assigned to a specified number of received power values in the normal weighting for a specified number of weights assigned to a specified number of received power values in the inverse weighting. By sharing the values of weights as above, the detection accuracy become equivalent between the forward detection and the backward detection, and storage capacity may also be saved when the values of weights are prepared in advance.

In the present embodiment, the radar devices 11a and 11b output as a detection result the moving direction information that indicates whether the moving direction of the detected vehicle is a direction approaching the radar devices 11a and 11b or a direction moving away from the radar devices 11a and 11b. Then, in this case, the calculator 13 determines whether inverse weighting or normal weighting should be used to calculate a representative value of the received power, according to the moving direction information.

By so doing, when for example the traffic lane detection apparatus 10 is installed on the road, the traffic lane of a vehicle to be detected may be detected appropriately without applying any specific setting to the traffic lane detection apparatus 10 regarding whether the forward detection or the backward detection should be used in the detection.

The determiner 20 determines the number of received power values stored in the memory 12 that are to be used by the calculator 13 to calculate a representative value of the received power. In the present embodiment, the radar devices 11a and 11b output the distance between the detected vehicle and the radar devices 11a and 11b as a detection result. In this case, the determiner 20 determines the number of received power values that is to be used by the calculator 13 to calculate the above-mentioned representative value at the aforementioned specified time, according to the distance between a vehicle to be detected at the specified time and the radar devices 11a and 11b.

When a vehicle to be detected is traveling, for example, at a position far away from the radar devices 11a and 11b, variations are caused to a measurement value of the received power of the reflected wave of a radar wave from the vehicle to be detected. Further, these variations are not uniform but are often unbalanced. It is considered that such imbalances in the variations are mainly caused by the interference to the reflected wave that leaves the vehicle to be detected and directly arrives at the radar devices 11a and 11b, where the interference is caused by the reflection, diffraction or the like of the reflected wave occurring at other vehicles or the surface of a road.

When the above-described variations of a measurement value of the received power of the reflected wave are unbalanced as described above, an improvement in accuracy is not expected by increasing the data of a received power value that is used for calculating a representative value of the received power. For this reason, when a traffic lane in which a vehicle to be detected is traveling at a distant position is detected, the traffic lane detection apparatus 10 intentionally reduces the number of received power values that are used to calculate a representative value of the received power in comparison to a case when a vehicle to be detected is traveling at a close position. By so doing, the computational complexity for the calculation of a representative value of the received power decreases, and an improvement in responsivity is expected in the traffic lane detection.

Figure 4:
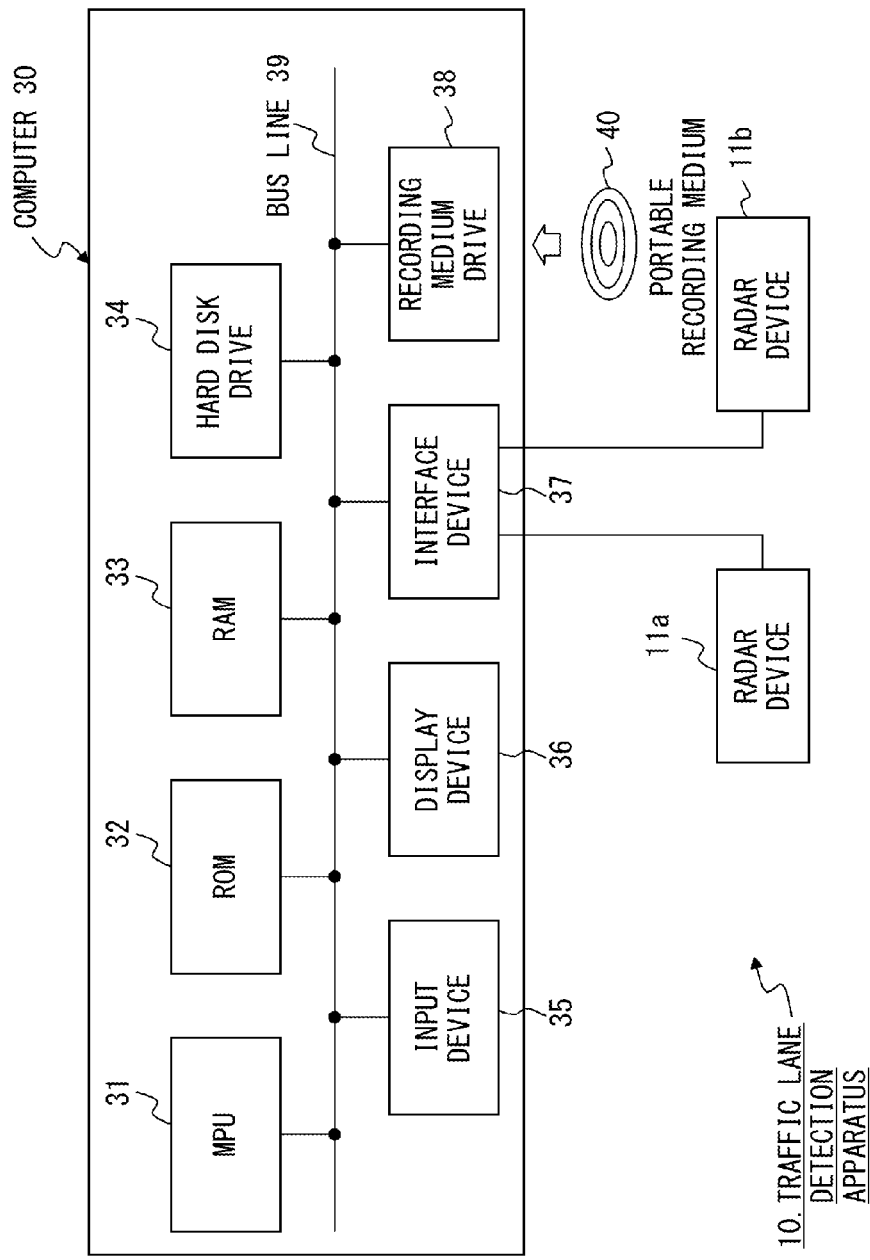
FIG. 4 illustrates an example of the hardware configuration of the traffic lane detection apparatus of FIG. 3.

Next, FIG. 4 will be explained. FIG. 4 illustrates an example of the hardware configuration of the traffic lane detection apparatus 10 of FIG. 3.

As illustrated in FIG. 4, in the present example of the configuration, the traffic lane detection apparatus 10 is configured in such a manner that the radar devices 11a and 11b are connected to the computer 30.

The computer 30 includes an MPU 31, a ROM 32, a RAM 33, a hard disk drive 34, an input device 35, a display device 36, an interface device 37, and a recording medium drive 38. These elements are connected via a bus line 39, and several types of data may be exchanged thereamong under the control of the MPU 31.

The MPU (Micro Processing Unit) 31 is a processor that controls all of the operations of the computer 30.

The ROM (Read Only Memory) 32 is a read-only semiconductor memory in which a specified basic control program is stored in advance. The MPU 31 performs operational control of the elements of the computer 30 by reading and executing this basic control program when the computer 30 is booted.

The RAM (Random Access Memory) 33 is an anytime-readable semiconductor memory that is used as a working storage as necessary when the MPU 31 executes several types of control programs. When the computer 30 is used to configure the traffic lane detection apparatus 10, the RAM 33 may also function as the memory 12 of FIG. 3.

The hard disk drive 34 is a storage device in which several types of control programs or several types of data to be used by the MPU 31 are stored. The MPU 31 performs several control processes by reading and executing a specified control program stored in the hard disk drive 34.

The input device 35 is, for example, a keyboard device or a mouse device, and when operated, for example, by an administrator of the traffic lane detection apparatus 10, the input device 35 obtains an input of several types of information that are associated with the operation from the administrator, and outputs the obtained input information to the MPU 31.

The display device 36 is, for example, a liquid crystal display, and displays several types of text or images according to the display data transmitted from the MPU 31.

The interface device 37 manages the communication of several types of information with several kinds of devices connected to the computer 30. The radar devices 11a and 11b are connected to the interface device 37.

Once the radar devices 11a and 11b detect a vehicle, the radar devices 11a and 11b output, as detection information, values of the distance from the radar devices 11a and 11b and the speed of the vehicle and an instantaneous value of the received power of the reflected wave of the emitted radar wave from the vehicle. Note that the speed value may have a positive value or a negative value, and positive values indicate that a vehicle is traveling in a direction moving away from the radar devices 11a and 11b and negative values indicate that a vehicle is traveling in a direction approaching the radar devices 11a and 11b. The detection information is taken into the computer 30 via the interface device 37.

The recording medium drive 38 reads several types of control programs or data stored in the portable recording medium 40. The MPU 31 may be configured to read via the recording medium drive 38 and execute a specified control program recorded in the portable recording medium 40, thereby performing several control processes which will be described later. The portable recording medium 40 may include, for example, a CD-ROM (Compact Disc Read Only Memory) or a DVD-ROM (Digital Versatile Disc Read Only Memory), or a flash memory having a USB (Universal Serial Bus) connector.

In order to use such a computer 30 to configure the traffic lane detection apparatus 10, a control program is for example created which makes the MPU 31 execute a traffic lane detecting process which will be described later. The created control program is stored in the hard disk drive 34 or in the portable recording medium 40 in advance. Then, a specified instruction is given to the MPU 31 such that the control program will be read and executed. By so doing, the computer 30 functions as the memory 12, the calculator 13, the discriminator 14, and the determiner 20, and the traffic lane detection apparatus 10 is configured with the computer 30.

Next, a traffic lane detecting process performed by the computer 30 will be described. FIG. 5 is a flowchart illustrating the process of how a traffic lane is detected.

When the processes in FIG. 5 are started, firstly, the MPU 31 performs the process of starting a timer in S101. In this process, a timer provided for the MPU 31 is initialized to start measuring the time.

Next, in S102, the MPU 31 refers to the numeric value indicated by the timer that started measuring the time in S101, and determines whether or not a specified period of time has passed. Here, the MPU 31 shifts the process to S103 when it is determined that a specified period of time has passed (i.e., when the determination result is "Yes"). On the other hand, the MPU 31 shifts the process back to S102 and repeats the aforementioned process when it is determined that a specified period of time has not passed (i.e., when the determination result is "No").

In S103, the MPU 31 performs the process of obtaining a measurement value. In this process, the detection information of a vehicle transmitted from each of the radar devices 11a and 11b is obtained via the interface device 37, and the obtained detection information is stored in the RAM 33 on a temporary basis.

Here, FIGS. 6A and 6B will be explained. FIGS. 6A and 6B illustrate the structure of detection information tables 51a and 51b.

The MPU 31 stores the detection information of a vehicle transmitted from each of the radar devices 11a and 11b in the RAM 33 on a temporary basis by storing the data in the detection information tables 51a and 51b which are secured in a specified area of the RAM 33. Note that the detection information table 51a stores the detection information obtained by the radar device 11a, and the detection information table 51b stores the detection information obtained by the radar device 11b.

In the detection information tables 51a and 51b, the data of "time", "distance", "speed", and "power" for each record is stored.

"Time" refers to the data of the time at which several types of detection information stored in the same record are obtained.

"Distance", "speed", and "power" refer to the data of the distance between the vehicle and the radar devices 11a and 11b, the data of the speed of the vehicle, and the data of the instantaneous value of a received power of the reflected wave of the emitted radar wave from the vehicle, respectively, out of the detection information of a vehicle.

In the detection information table 51a illustrated in FIG. 6A, there are two records in which "time" is T1. This indicates that there are at least two vehicles which travel at different positions (i.e., at different distances from the radar device 11a), and that the radar device 11a detected these two vehicles as independent vehicles.

FIG. 5 will be explained again below.

Next, the MPU 31 performs the process of creating a vehicle group in S104. In the process of creating a vehicle group, the detection information about the same vehicle group is extracted from the detection information obtained from the radar devices 11a and 11b, and a data set for each vehicle group is created. Note that a vehicle group refers to a group of vehicles that are in adjacent lanes at almost the same distance.

Figure 7:
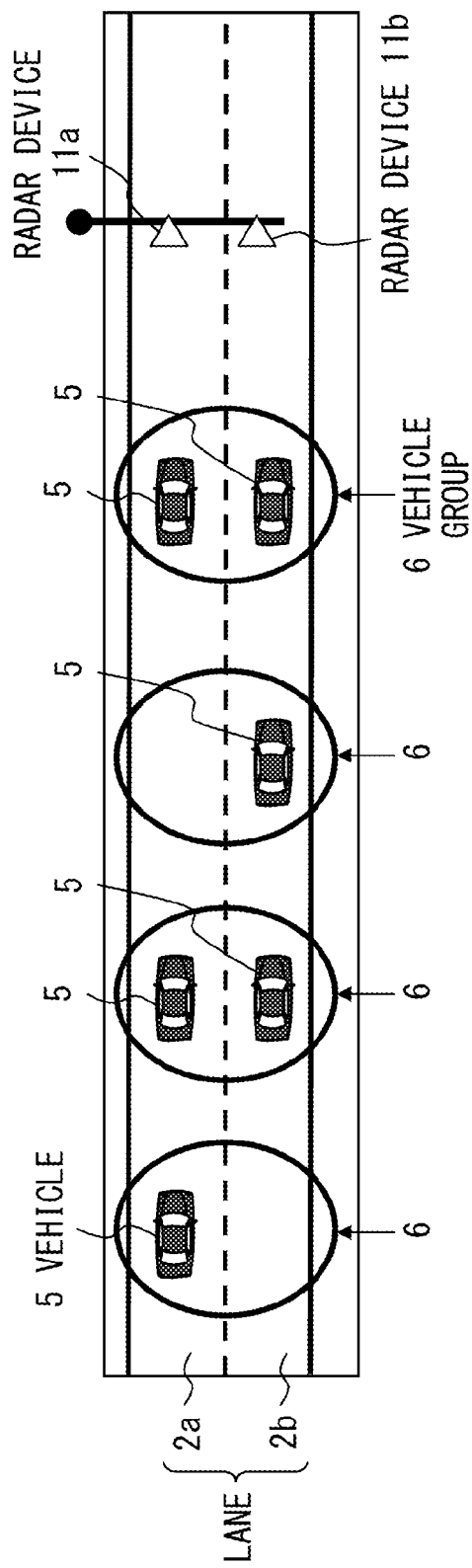
FIG. 7 illustrates vehicle groups.

As illustrated in FIG. 7, the radar devices 11a and 11b, which are installed in the respective lanes 2a and 2b, are not capable of detecting vehicle groups 6 to which two or more vehicles 5 belong in such a manner that the vehicles 5 are discriminated on a one-to-one basis. For this reason, in the traffic lane detecting process of FIG. 5, the vehicle group 6 is created as a unit to be detected, and traffic lanes are detected from each of the vehicle groups 6.

The process of creating a vehicle group will be described later.

Next, the MPU 31 performs the process of detecting the direction of travel in S105. This process is performed to determine whether the vehicle group 6 is traveling in a direction approaching the radar devices 11a and 11b or in a direction moving away from the radar devices 11a and 11b. In this detection process, it is possible to determine whether the detection of the vehicle 5 (vehicle group 6) used in the traffic lane detection apparatus 10 is performed by the aforementioned forward detection or backward detection.

In the present embodiment, the direction of travel is determined on the basis of the positive or negative sign of the speed information in the detection information of the vehicle 5 (vehicle group 6) obtained by the radar devices 11a and 11b. Details of that process will be described later.

Next, the MPU 31 performs the process of determining the data to be used in S106. In this process, the types and number of the data to be used for the calculation of a representative value of the received power, which will be performed in the next step, S107, are determined. In the present embodiment, the number of types of data to be used is determined on the basis of the distance between the vehicle 5 (vehicle group 6) and the radar devices 11a and 11b. Details of this process will be described later.

Next, the MPU 31 performs the process of calculating a received power representative value in S107. In this process, a representative value, at the time when this process is to be performed, of a received power received by the radar devices 11a and 11b from the vehicle 5 (vehicle group 6) which created the reflected wave of the radar wave is calculated from an instantaneous value of a received power of the reflected wave included in the detection information of the vehicle 5 (vehicle group 6). Note that in the present embodiment, the calculation of a representative value of a received power at the time when this process is to be performed is differentiated between the cases of the forward detection and the cases of the backward detection. This process of calculating a received power representative value will be described later in detail.

Next, the MPU 31 performs the process of detecting a lane in S108. In this process, received power representative values calculated in the process of S107 are compared between the values obtained by the radar device 11a and the values obtained by the radar device 11b, and according to the comparison result, a lane in which the vehicle 5 (vehicle group 6) to be detected is traveling is detected. This process of detecting a lane will be described later in detail.

Next, the MPU 31 performs the process of outputting a determination result in S109. In this process, the interface device 37 is controlled to output a determination result of the process of detecting a lane in S108 to another device, such as a device that controls the timing of switching signals of a traffic signal installed on the road in accordance with the amount of traffic on the road.

When the process of S109 is completed later, the MPU 31 returns the process back to S102, and when a specified period of time elapses after the time at which the previous process of S103 or later is started, the processes of S103 to S109 are restarted to detect a traffic lane of the vehicle 5 (vehicle group 6) to be detected.

The traffic lane detecting process is composed of the above-described processes. Note that the MPU 31 may function as the calculator 13 of FIG. 3 by performing the processes of S105 and S107 in FIG. 5, and the MPU 31 may function as the determiner 20 of FIG. 3 by performing the process of S106 in FIG. 5. Further, the MPU 31 may perform as the discriminator 14 of FIG. 3 by performing the process of S108 in FIG. 5.

Next, the process of creating a vehicle group, which is the process of S104 in the processes of FIG. 5, will be described in detail with reference to the flowchart of FIG. 8.

Figure 8:
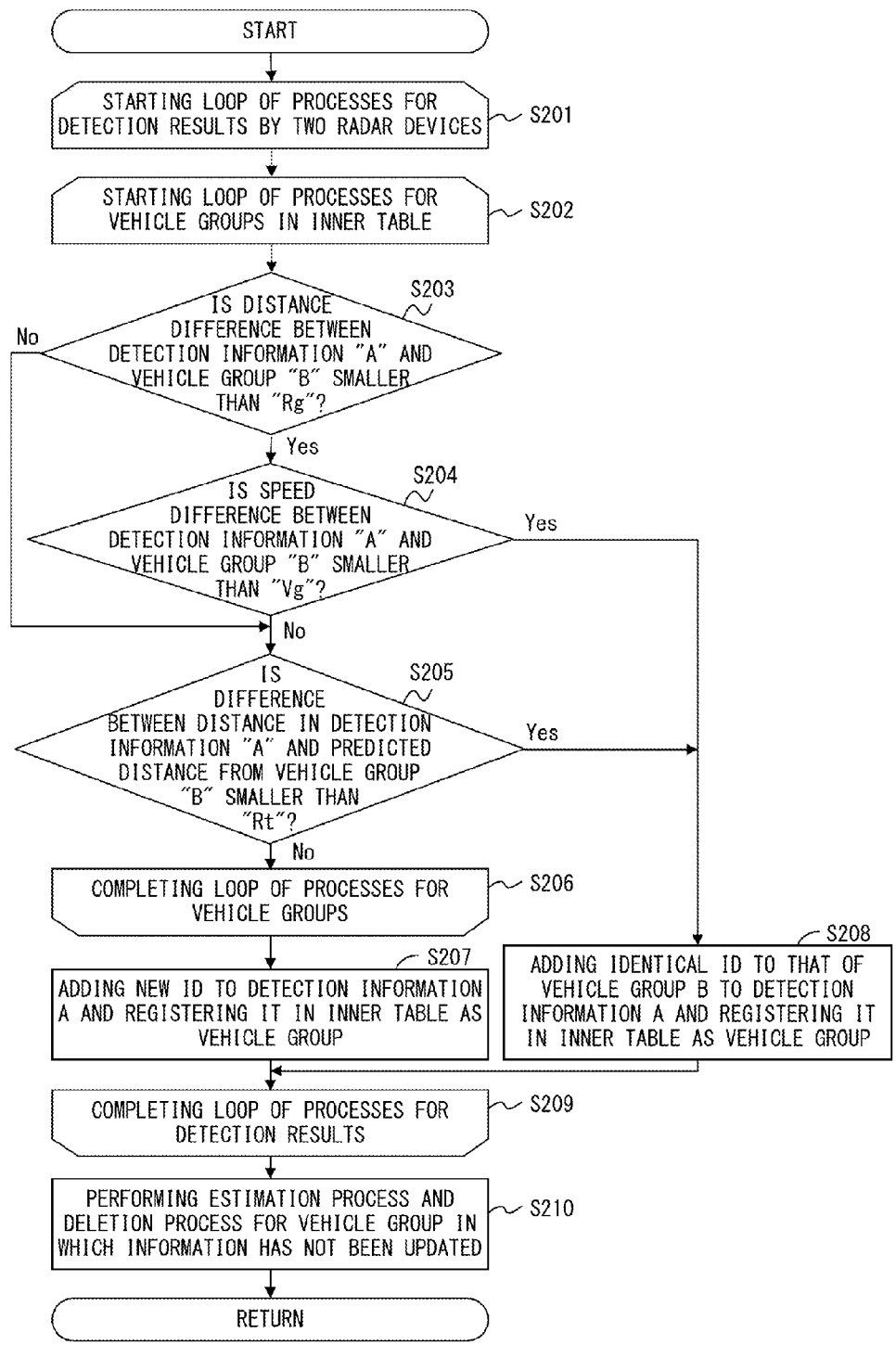
FIG. 8 is a flowchart illustrating the process of how a vehicle group is created.

In FIG. 8, a loop of processes between S201 and S209 is indicated. This loop of processes indicates that processes between S202 and S208 performed for one piece of the detection information stored in the detection information tables 51a and 51b are performed for all of the already obtained detection information. In the following processes, detection information to be processed (i.e., one of the records in the detection information tables 51a and 51b) is referred to as "detection information A".

Moreover, a loop of processes between S202 and S206 is indicated. This loop of processes indicates that processes between S203 and S205 performed for one of the vehicle groups whose data is stored in an inner table are performed for all of the vehicle groups whose data is stored in an inner table. In the following processes, a vehicle group to be processed (i.e., one of the records in an inner table) is referred to as "vehicle group B".

Here, an inner table is explained. An inner table is secured in a specified area of the RAM 33, and modification, addition, and deletion of the stored data are performed by the MPU 31 in the execution of a traffic lane detecting process of FIG. 5.

Here, FIG. 9 will be explained. FIG. 9 illustrates the structure of an inner table 52.

In the inner table 52, the data of "ID", "distance", "speed", "power", "direction", and "lane" for each record is stored.

"ID" refers to the identification codes that are individually assigned for identification to the vehicle groups detected by the radar devices 11a and 11b. The several types of information stored as the same record in the inner table 52 refer to a vehicle group specified by the "ID".

"Time" refers to the data of the time at which the radar device 11a or 11b obtained several types of information about the vehicle group stored in the same record.

"Distance" and "speed" refer to the data of the distance between the vehicle group and the radar device 11a or 11b, and the data of the speed of the vehicle group, respectively, out of the information about a vehicle group.

"Power" refers to the data of the received power value (instantaneous value of a received power) obtained by each of the radar devices 11a and 11b, where the received power value is derived from the reflected wave of the emitted radar wave from the vehicle group, out of the detection information about a vehicle group.

"Direction" is the data of a determination result of whether a vehicle group is traveling in a direction approaching the radar devices 11a and 11b or in a direction moving away from the radar devices 11a and 11b, and is the data stored in the process of detecting the direction of travel. Here, "+" in the value of "direction" indicates that a vehicle group is traveling in a moving-away direction (backward detection), and "−" in the value of "direction" indicates that a vehicle group is traveling in an approaching direction.

"Lane" refers to the data of a result of determining the traffic lane of a vehicle group, and is the data stored in the process of detecting the direction of a lane. Here, "a" in the value of "lane" indicates that a vehicle group is traveling in the lane 2a in which the radar device 11a is installed, and "b" in the value of "lane" indicates that a vehicle group is traveling in the lane 2b in which the radar device 11b is installed.

Note that the RAM 33 that stores the inner table 52 provides a function of the memory 12 of FIG. 3.

FIG. 8 will be explained again below.

Next, in S203, the MPU 31 determines whether or not a difference between the "distance" data in the detection information A and the "distance" data in the vehicle group B is smaller than a specified distance threshold Rg. When the difference in distance is determined to be smaller than the distance threshold Rg (i.e., when a determination result is "Yes"), the MPU 31 shifts the process to S204. On the other hand, when the difference in distance is determined to be equal to or greater than the distance threshold Rg (i.e., when a determination result is "No"), the MPU 31 shifts the process to S205.

Next, in S204, the MPU 31 determines whether or not a difference between the "speed" data in the detection information A and the "speed" data in the vehicle group B is smaller than a specified speed threshold Vg. When the difference in speed is determined to be smaller than the speed threshold Vg (i.e., when a determination result is "Yes"), the MPU 31 shifts the process to S208. On the other hand, when the difference in speed is determined to be equal to or greater than the speed threshold Vg (i.e., when a determination result is "No"), the MPU 31 shifts the process to S205.

Next, in S205, the MPU 31 determines whether or not a difference between the "distance" data in the detection information A and a predicted value of the distance from the vehicle group B at the acquisition time of the detection information A (difference from the predicted distance) is smaller than a specified predicted distance threshold Rt. Here, a predicted value of the distance from the vehicle group B is calculated by adding the predicted distance of movement, which is obtained by multiplying the "speed" data of the vehicle group B by an elapsed time between the "time" data of the vehicle group B and the "time" data in the detection information A, to the "distance" data in the vehicle group B. When the difference from the predicted distance is determined to be smaller than the distance threshold Rt (i.e., when a determination result is "Yes"), the MPU 31 shifts the process to S208. On the other hand, when the difference in distance is determined to be equal to or greater than the distance threshold Rt (i.e., when a determination result is "No"), the MPU 31 shifts the process to S206.

In S206, the MPU 31 determines whether or not the loop of processes between S202 and S206 should be terminated. When it is determined that the processes between S203 and S205 are performed for all the vehicle groups whose data is stored in the inner table 52, the MPU 31 terminates the loop of processes, and then shifts the process to S207. On the other hand, when the data of a vehicle group for which the processes between S203 and S205 have not been performed is stored in the inner table 52, the MPU 31 performs the processes between S203 and S205 for that vehicle group.

The MPU 31 executes the process of S207 as a result of estimation that a record of the vehicle group to which a target vehicle belongs in the detection information A does not exist in the inner table 52 according to the result of the aforementioned determination in S203, S204, and S205. In S207, the MPU 31 adds a record to which new "ID" data is assigned to the inner table 52, and stores the detection information A in the field corresponding to that record, thereby registering a target vehicle in the detection information A as a new vehicle group. When the process of S207 is completed, the MPU 31 shifts the process to S209.

The process of S208 is performed when the results of the determination in S203 and S204 are both "Yes", or when the result of the determination in S205 is "Yes" even though the result of the determination in S203 or S204 is "No". In other words, when one of these two conditions is met, the MPU 31 performs the process of S208 as a result of estimation that a record of the vehicle group to which a target vehicle belongs in the detection information A exists in the inner table 52. In S208, the MPU 31 adds a record to which the same "ID" data as that of the vehicle group B is assigned to the inner table 52, and stores the detection information A in the field corresponding to the record, thereby registering a target vehicle in the detection information A as a vehicle that belongs to the vehicle group B. When the process of S208 is completed, the MPU 31 shifts the process to S209, and at the same time, the loop of processes between S202 and S206 is forcibly terminated.

In S209, the MPU 31 determines whether or not the loop of processes between S201 and S209 should be terminated. When it is determined that the processes between S202 and S208 are performed for all the detection information stored in the detection information tables 51a and 51b, the MPU 31 terminates the loop of processes, and then shifts the process to S210. On the other hand, when the detection information for which the processes between S202 and S208 have not been performed is stored in the detection information table 51a or 51b, the MPU 31 performs the processes between S202 and S208 for that detection information.

In S210, the MPU 31 adds a record which includes estimation data to, or deletes a record as below from, a vehicle group to which a record in the inner table 52 has not been added in the preceding processes between S201 and S209.

In this process, the MPU 31 firstly refers to the inner table 52, and extracts from the inner table 52 a record that does not match the "time" data of the records in the detection information tables 51a and 51b. Next, the MPU 31 excludes from the extraction in the future the extracted records whose "ID" data matches the records that are not extracted from the inner table 52 (i.e., the records that correspond to the "time" data in the detection information tables 51a and 51b). A record is added to or deleted from the remaining vehicle groups whose records are still to be extracted.

Once vehicle groups to be processed are specified, the MPU 31 then determines whether or not the record should be deleted therefrom. In this determination process, the MPU 31 firstly obtains recent "time" data at which a result of detecting a vehicle group to be processed was being acquired by the radar devices 11a and 11b. Then, the MPU 31 determines whether or not an elapsed time between the recent "time" and a current time (i.e., the time of the "time" data of the records in the detection information tables 51a and 51b) is longer than a specified deletion determination time threshold Tt. When the elapsed time is longer than a deletion determination time threshold Tt, the MPU 31 deletes from the inner table 52 all the records to which the "ID" data of a vehicle group to be processed is assigned. On the other hand, when the elapsed time is equal to or shorter than a deletion determination time threshold Tt, the MPU 31 performs the addition of a record which includes estimation data, which will be described below.

In this process of adding a record, the MPU 31 firstly performs the process of data estimation. In this process, the MPU 31 firstly refers to the inner table 52, and then acquires, from a record whose "time" data is the closest to the current time in a vehicle group to be processed, "distance" data, "speed" data, and "power" data of each of the radar devices 11a and 11b. The obtained "distance" data, "speed" data, and "power" data will be referred to as R0, V0, and P0, and the "time" data in the record in which these pieces of data were included is referred to as T0. Here, the MPU 31 calculates the estimates R1, V1, and P1 of the data at the current time T1 by performing the calculation of the following equations.

$$R1 = R0 + V0(T1-T0)$$

$$V1 = V0$$

$$P1 = P0$$

Subsequently, the MPU 31 adds the record of the current time T1 of the vehicle group to be processed to the inner table 52, and stores the calculated estimates R1, V1, and P1 in the record. Note that a sign is assigned to the "time" data in the record, and the sign indicates that the pieces of data included in the record together with the data of the current time T1 are estimates and are not based on the actual detection results obtained by the radar devices 11a and 11b. In the aforementioned process of determining whether or not the record should be deleted, whether or not the pieces of data included in the record are based on the actual detection results obtained by the radar devices 11a and 11b is determined according to the existence of this flag.

Once the process of S210 is completed, the process of creating a vehicle group is also completed, and the MPU 31 returns the process back to the traffic lane detecting process of FIG. 5.

The process of creating a vehicle group is composed of the above-described processes. FIG. 10 depicts examples of the data in the inner table 52 after the process of creating a vehicle group is completed. These examples of the data indicate examples of the data in the inner table 52 at the time when the process of creating a vehicle group is completed, where the examples of the data previously were as depicted in FIG. 9 when the process of creating a vehicle group was to be started. Note that when there is no "power" data to be stored, such a value is indicated as "none".

Next, the process of detecting the direction of travel, which is the process of S105 depicted in FIG. 5, will be described in detail with reference to the flowchart of FIG. 11.

Figure 11:
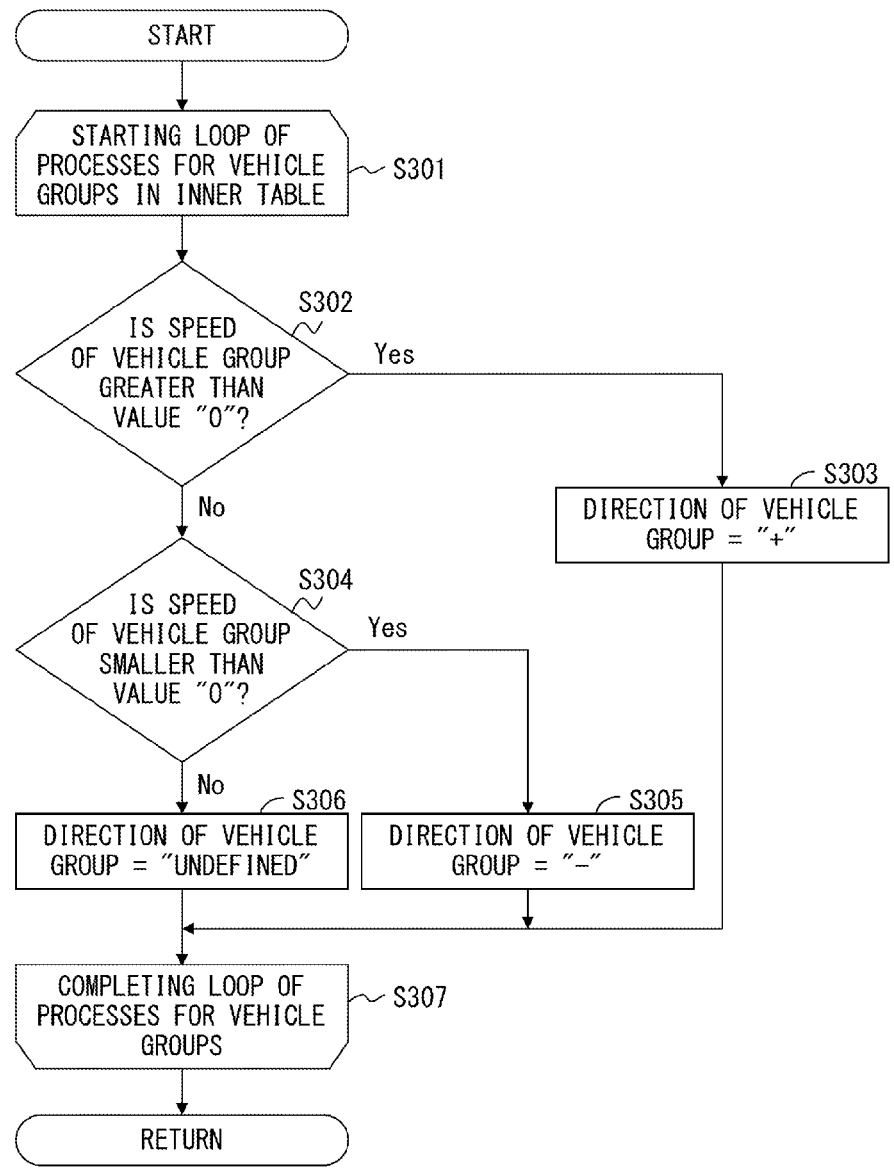
FIG. 11 is a flowchart illustrating the process of how the direction of travel is detected.

Firstly, a loop of processes between S301 and S307 is expressed in FIG. 11. This loop of processes indicates that the processes between S302 and S306, which are performed for one of the vehicle groups whose data is stored in the inner table 52, are performed for all the vehicle groups whose data is stored in the inner table 52.

Next, in S302, the MPU 31 determines whether or not the "speed" data of a vehicle group to be processed is greater than the value "0". In other words, the MPU 31 determines whether or not a vehicle group is traveling in a direction moving away from the radar devices 11a and 11b.

When it is determined in the determination process of S302 that the "speed" data is greater than the value "0" (i.e., when a determination result is "Yes"), the MPU 31 shifts the process to S303. In S303, the MPU 31 assigns the value "+" as "direction" data to the record of the vehicle group to be processed in the inner table 52, and then shifts the process to S307. On the other hand, when it is determined in the determination process of S302 that the "speed" data is equal to or smaller than the value "0" (i.e., when a determination result is "No"), the MPU 31 shifts the process to S304.

Next, in S304, the MPU 31 determines whether or not the "speed" data of a vehicle group to be processed is smaller than the value "0", i.e., determines whether or not the direction of travel of the vehicle group is a direction approaching the radar devices 11a and 11b.

When it is determined in the determination process of S304 that the "speed" data is smaller than the value "0" (i.e., when a determination result is "Yes"), the MPU 31 shifts the process to S305. In S305, the MPU 31 assigns the value "−" as "direction" data to the record of the vehicle group to be processed in the inner table 52, and then shifts the process to S307. On the other hand, when it is determined in the determination process of S302 that the "speed" data is greater than the value "0" (i.e., when a determination result is "No"), the MPU 31 shifts the process to S306.

The process of S306 is performed when the "speed" data of a vehicle group to be processed is the value "0". In S306, the MPU 31 sets the value "undefined" as "direction" data to the record of the vehicle group to be processed in the inner table 52, and then shifts the process to S307.

In S307, the MPU 31 determines whether or not the loop of processes between S301 and S307 should be terminated. When it is determined that the processes between S302 and S306 are performed for all the vehicle groups whose data is stored in the inner table 52, the MPU 31 terminates the loop of processes to terminate the process of detecting the direction of travel, and then shifts the process back to the traffic lane detecting process of FIG. 5. On the other hand, when the data of a vehicle group for which the processes between S302 and S306 have not been performed is stored in the inner table 52, the MPU 31 performs the processes between S302 and S306 for that vehicle group.

The process of detecting the direction of travel is composed of the above-described processes. FIG. 12 depicts examples of the data in the inner table 52 after the process of detecting the direction of travel is completed. These examples of the data indicate examples of the data in the inner table 52 at the time when the process of detecting the direction of travel is completed, where the examples of the data previously were as depicted in FIG. 10 when the process of detecting the direction of travel was to be started. In the area of "direction" data where the value is undefined, the value "−" is stored.

Next, the process of determining the data to be used, which is the process of S106 depicted in FIG. 5, will be described in detail with reference to the flowchart of FIG. 13.

Figure 13:
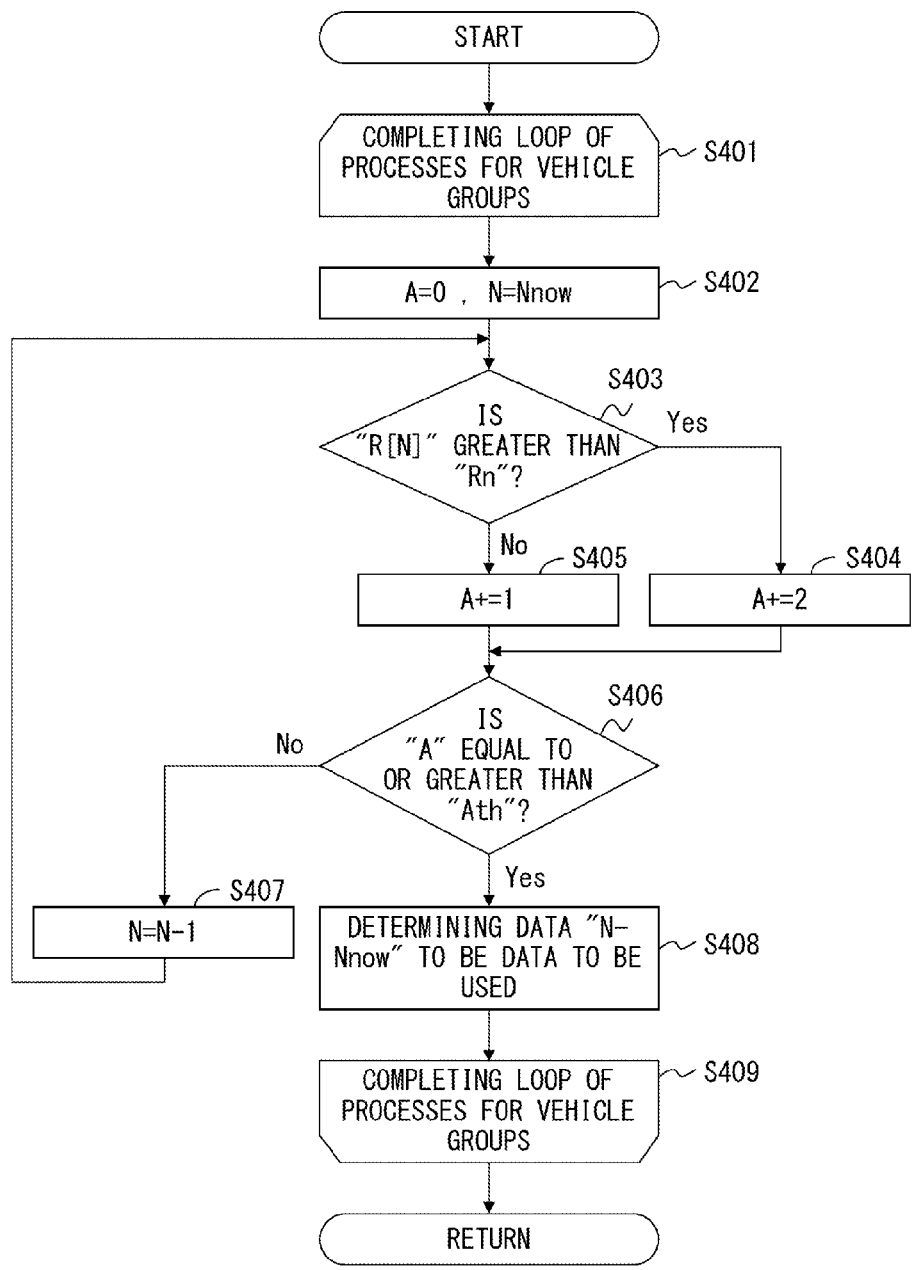
FIG. 13 is a flowchart illustrating the process of how the data to be used is determined.

Firstly, a loop of processes between S401 and S409 is expressed in FIG. 13. This loop of processes indicates that the processes between S402 and S408, which are performed for one of the vehicle groups whose data is stored in the inner table 52, are performed for all the vehicle groups whose data is stored in the inner table 52.

Next, in S402, the MPU 31 substitutes the initial value "0" for a variable A, and substitutes an initial value Nnow for a variable N. Note that in the present embodiment, the initial value Nnow is the acquisition time of the detection information obtained in the recently performed process of obtaining a measurement value (S103 in FIG. 5).

Next, in S403, the MPU 31 determines whether or not a distance R[N] from a vehicle group to be processed is greater than a specified distance threshold Rn. Note that the distance R[N] is the "distance" data in the record where the "time" data is N, from the record of the vehicle group to be processed in the inner table 52. In other words, in this determination process, whether or not the distance between a vehicle group to be processed and the radar devices 11a and 11b at the time N is greater than the distance threshold Rn is determined.

When the distance R[N] is determined to be greater than the distance threshold Rn (i.e., when a determination result is "Yes") in the determination process of S403, the MPU 31 shifts the process to S404 to increment the value of the variable A by "2", and then shifts the process to S406. On the other hand, when the distance R[N] is determined to be equal to or smaller than the distance threshold Rn (i.e., when a determination result is "No") in the determination process of S403, the MPU 31 shifts the process to S405 to increment the value of the variable A by "1", and then shifts the process to S406.

When the distance between a vehicle group to be processed and the radar devices 11a and 11b is greater than the distance threshold Rn in the processes between S403 and S405 above, the incrementing of the variable A becomes greater than when the distance is equal to or smaller than the distance threshold Rn.

Next, in S406, the MPU 31 determines whether or not a current value of the variable A has become equal to or greater than the threshold Ath. When the value of the variable A is determined to be equal to or greater than the threshold Ath (i.e., when a determination result is "Yes"), the MPU 31 shifts the process to S408. On the other hand, when the value of the variable A is determined to be still less than the threshold Ath (i.e., when a determination result is "No"), the MPU 31 shifts the process to S407.

In S407, the time indicated by the variable N is made earlier by one, i.e., the MPU 31 changes the acquisition time of the detection information which has been indicated by the value of the variable N to the time at which the immediately preceding detection information was acquired, and the MPU 31 shifts the process back to S403.

In S408, the MPU 31 determines the values of records between the record of the time specified by a current value of the variable N and the record of the time specified by the initial value Nnow to be the data used for the calculation of a representative value of the received power from a vehicle group to be processed. Note that the number of pieces of data used for the calculation of a representative value of the received power, which is determined in the above process, is referred to as "Nd". The value of "Nd" will be used in the process of calculating a received power representative value which will be described later.

In S409, the MPU 31 determines whether or not the loop of processes between S401 and S409 should be terminated. When it is determined that the processes between S402 and S408 are performed for all the vehicle groups whose data is stored in the inner table 52, the MPU 31 terminates the loop of processes to terminate the process of determining the data to be used, and then shifts the process back to the traffic lane detecting process of FIG. 5. On the other hand, when the data of a vehicle group for which the processes between S402 and S408 have not been performed is stored in the inner table 52, the MPU 31 performs the processes between S402 and S408 for that vehicle group.

The process of determining the data to be used is composed of the above-described processes. By performing these processes, when a traffic lane of a vehicle to be detected which is traveling at a position farther than a threshold is detected, the number of received power values used for the calculation of a representative value of the received power is reduced in comparison to a case when a vehicle to be detected is traveling at a position closer than a threshold.

Next, the process of calculating a received power representative value, which is the process of S107 depicted in FIG. 5, will be described in detail with reference to the flowchart in FIG. 14 and the examples of the data in the inner table 52 in FIG. 15.

The data obtained when the process of calculating a received power representative value is started, i.e., the data obtained when the aforementioned process of determining the data to be used has just been completed, is depicted in FIG. 15 as examples of the data. Note that the data of the same vehicle group whose "ID" data is "ID1" is extracted and depicted in FIG. 15 as the examples of the data.

Figure 14:
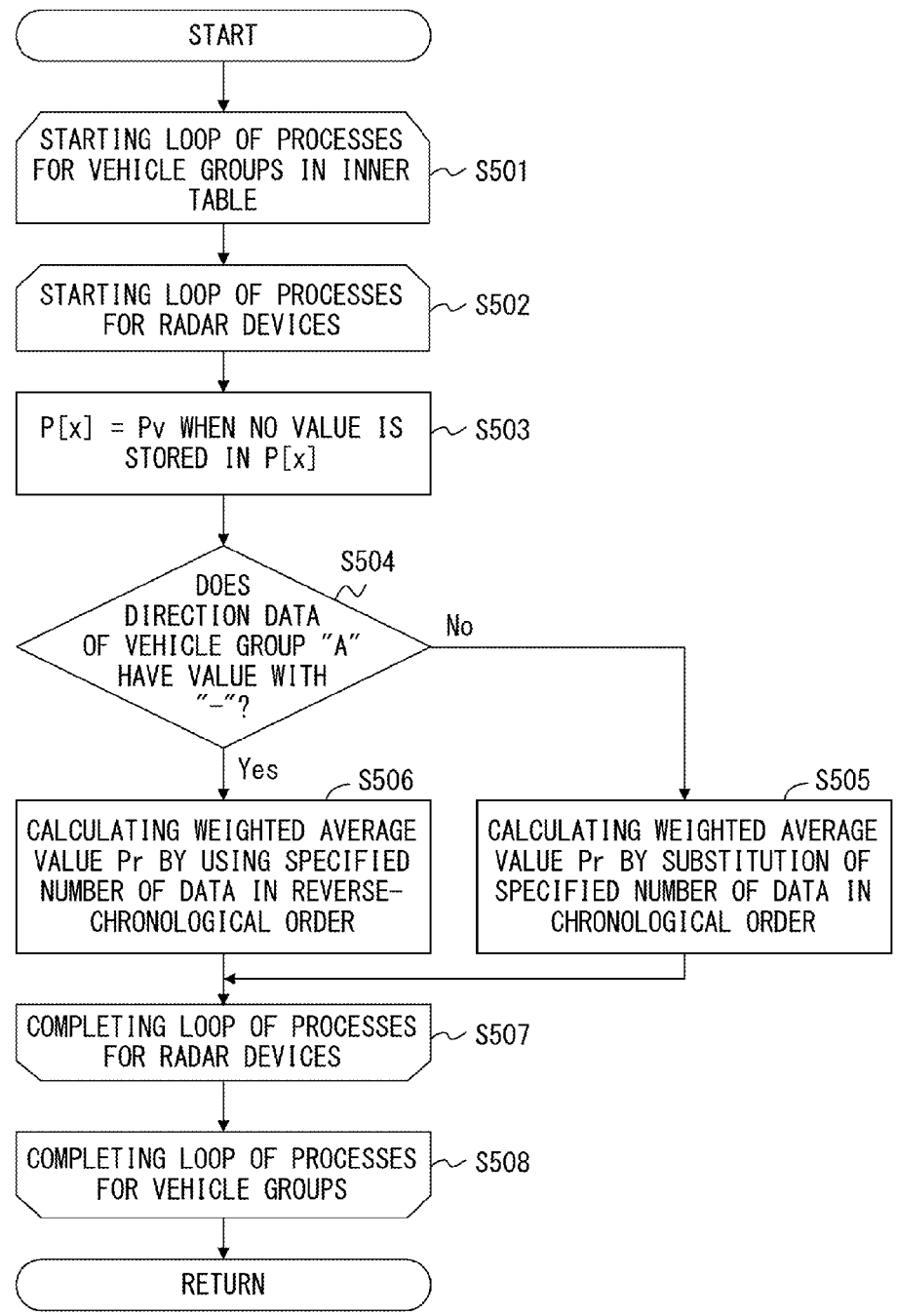
FIG. 14 is a flowchart illustrating the process of how a received power representative value is calculated.

Firstly, a loop of processes between S501 and S508 is expressed in FIG. 14. This loop of processes indicates that the processes between S502 and S507, which are performed for one of the vehicle groups whose data is stored in the inner table 52, are performed for all the vehicle groups whose data is stored in the inner table 52.

Next, a loop of processes between S502 and S507 is expressed. This loop of processes indicates that the calculation of a representative value of the received power in the processes between S503 and S507, which are performed for one of the radar devices 11a and 11b, are performed for both the radar devices 11a and 11b.

The examples of the data of FIG. 15 will be referred to in the following explanation. In the loop of processes, the MPU 31 firstly performs the processes between S503 and S507 for "power" data P11[1] through P11[5] obtained by the radar a. Next, the MPU 31 performs the processes between S503 and S507 for "power" data P12[1] through P12[5] obtained by the radar b.

In the explanation of S503 to S507 below, the "power" data obtained by the radar devices 11a and 11b will be referred to as P[x] without discriminating between the radar device 11a and the radar device 11b. Note that in the examples of the data of FIG. 15, the value of x may be one of 1, 2, 3, 4, and 5.

In S503, all the "power" data P[x] in the inner table 52 obtained by the radar device to be processed from a vehicle group to be processed is referred to, and the MPU 31 stores a tentative value Pv when no value is stored therein. This tentative value Pv may be, for example, the value "0".

Next, in S504, the MPU 31 determines whether or not the "direction" data of a vehicle group to be processed in the inner table 52 has a value with "−". In other words, the MPU 31 determines whether or not the direction of travel of a vehicle group to be processed is a direction approaching the radar devices 11a and 11b. When the "direction" data of a vehicle group to be processed is determined to have a value with "−" (i.e., when a determination result is "Yes"), the MPU 31 shifts the process to S506. On the other hand, when the "direction" data of a vehicle group to be processed is determined not to have a value with "−" (i.e., when a determination result is "No"), the MPU 31 shifts the process to S505.

The process of S505 is performed according to a result of the determination made by the traffic lane detection apparatus 10 as a result of the determination in S504 that the traffic lane of a vehicle to be detected should be detected by using backward detection. In S505, the MPU 31 calculates a weighted average value Pr of Nd pieces of data out of the "power" data P[x] as a representative value of the received power that the radar device to be processed received, where the radar device to be processed received the reflected wave from a vehicle group to be processed. Note that in S505, Nd pieces of "power" data P[x] whose acquisition time is closer to the current time are selected, and a weighted average value Pr is calculated by assigning to the selected data normal weights where the weight is greater as the acquisition time becomes closer to the current time. The value of Nd indicates the number of pieces of data used for the calculation of a representative value of the received power which is obtained by the aforementioned process of determining the data to be used.

As an example of the process of S505 in which a representative value of the received power at the radar device 11a is calculated, the process of how the process is performed when Nd is "3" in the examples of the data of FIG. 15 will be explained.

In this case, the MPU 31 selects P11[5], P11[4], and P11[3] from examples of the data of FIG. 15 in the listed order, where the acquisition time should be at or earlier than the current time T5 and priority is given to the acquisition time which is closer to the current time T5. Then, the MPU 31 performs the calculation of equation (1) below to calculate a weighted average value Pr1, and determines the calculated weighted average value Pr1 to be a representative value of the received power that the radar device 11a received, where the radar device 11a received the reflected wave from a vehicle group to be processed.

$$Pr1 = \frac{\alpha1 \times P11[5] + \alpha2 \times P11[4] + \alpha3 \times P11[3]}{\alpha1 + \alpha2 + \alpha3} \quad (1)$$

Note that in equation (1) above, $\alpha1$, $\alpha2$, and $\alpha3$ indicate the weights that are assigned to the received power values of the reflected wave at the radar device 11a, and $\alpha1 > \alpha2 > \alpha3$. In other words, the assigned weight becomes greater as the acquisition time of the "power" data becomes closer to the current time T5.

Once the above-mentioned determination process of S505 is completed, the MPU 31 shifts the process to S507.

On the other hand, the process of S506 is performed according to a result of the determination made by the traffic lane detection apparatus 10 as a result of the determination in S504 that the traffic lane of a vehicle to be detected should be detected by using the forward detection. Also in S506, the MPU 31 calculates a weighted average value Pr of Nd pieces of data out of the "power" data P[x] as a representative value of the received power that the radar device to be processed received, where the radar device to be processed received the reflected wave from a vehicle group to be processed. Note that in S506, Nd pieces of "power" data P[x] whose acquisition time is closer to the current time are selected, and a weighted average value Pr is calculated by assigning to the selected data inverse weights where the weight is greater as the acquisition time becomes farther from the current time. The value of Nd indicates the number of pieces of data used for the calculation of a representative value of the received power which is obtained by the aforementioned process of determining the data to be used.

As an example of the process of S506 in which a representative value of the received power at the radar device 11a is calculated, the process of how the process is performed when Nd is "3" in the examples of the data of FIG. 15 will be explained.

In this case, the MPU 31 selects P11[5], P11[4], and P11[3] from examples of the data of FIG. 15 in the listed order, where the acquisition time should be at or earlier than the current time T5 and priority is given to an acquisition time which is closer to the current time T5. Then, the MPU 31 performs the calculation of equation (2) below to calculate a weighted average value Pr1, and determines the calculated weighted average value Pr1 to be a representative value of the received power that the radar device 11a received, where the radar device 11a received the reflected wave from a vehicle group to be processed. In other words, the assigned weight becomes greater as the acquisition time of the "power" data becomes farther from the current time T5.

$$Pr1 = \frac{\alpha1 \times P11[3] + \alpha2 \times P11[4] + \alpha3 \times P11[5]}{\alpha1 + \alpha2 + \alpha3} \quad (2)$$

Note that in equation (2) above, $\alpha1$, $\alpha2$, and $\alpha3$ indicate the weights that are assigned to the received power values of the reflected wave at the radar device 11a, and $\alpha1 > \alpha2 > \alpha3$.

In the present embodiment, $\alpha1$, $\alpha2$, and $\alpha3$ are shared between equation (1) and equation (2). In other words, in the process of S506, calculation of a weighted average value Pr1 is performed where the order of the three pieces of "power" data to be multiplied by each of the weights α1, α2, and α3 is reversed with reference to equation (1) in the added weighting portion of the right side of equation (2).

In the added weighting portion above, the order of the "power" data to be multiplied by weights is reversed. Alternatively, weighting may be added such that the order of the weights to be multiplied by the "power" data is reversed.

Once the above-mentioned determination process of s506 is completed, the MPU 31 shifts the process to S507.

In S507, the MPU 31 determines whether or not the loop of processes between S502 and S507 should be terminated. When it is determined that the processes between S503 and S506 are performed for both the radar devices 11*a* and 11*b* and then a representative value of the received power is calculated, the MPU 31 terminates the loop of processes, and then shifts the process to S508. On the other hand, when it is determined that the processes between S503 and S506 have not been performed and some representative values of the received power are left uncalculated, the MPU 31 performs the processes between S503 and S506 for that vehicle group.

In S508, the MPU 31 determines whether or not the loop of processes between S501 and S508 should be terminated. When it is determined that the processes between S502 and S507 are performed for all the vehicle groups whose data is stored in the inner table 52, the MPU 31 terminates the loop of processes to terminate the process of calculating a received power representative value, and then shifts the process back to the traffic lane detecting process of FIG. 5. On the other hand, when the data of a vehicle group for which the processes between S502 and 5507 have not been performed is stored in the inner table 52, the MPU 31 performs the processes between S502 and S507 for that vehicle group.

The process of calculating a received power representative value is composed of the above-described processes. As a result of these processes, a representative value of the received power of the reflected wave obtained at the radar device 11*a* and the radar device 11*b* may be obtained from all the vehicle groups.

Next, the process of detecting a lane, which is the process of S108 depicted in FIG. 5, will be described in detail with reference to the flowchart in FIG. 16 and the examples of the data in the inner table 52 in FIG. 17.

The data obtained when the process of detecting a lane is to be started, i.e., the data obtained when the above-described process of calculating a received power representative value has just been completed, is depicted as examples of the data in FIG. 17. In the record of the vehicle groups whose "time" data is "Tn", the data of the vehicle group at a time Tn is stored. It is to be noted that as "power" data in the record, a representative value of the received power at the time Tn obtained in the process of calculating a received power representative value is stored.

Firstly, a loop of processes between S601 and S609 is expressed in FIG. 16. This loop of processes indicates that the processes between S602 and S608, which are performed for one of the vehicle groups whose data is stored in the inner table 52, are performed for all the vehicle groups whose data is stored in the inner table 52.

Next, in S602, the MPU 31 firstly obtains from the inner table 52 a received power representative value Pr1 obtained at the radar device 11*a* from the vehicle group to be processed and a received power representative value Pr2 at the radar device 11*b* from the vehicle group to be processed. Then, the MPU 31 determines whether or not the obtained values of Pr1 and Pr2 are both smaller than an effectiveness determination power threshold Pm. When the values of Pr1 and Pr2 are determined to both be smaller than the threshold Pm (i.e., when a determination result is "Yes"), the MPU 31 shifts the process to S603. On the other hand, when at least one of the values of Pr1 and Pr2 is determined to be greater than the threshold Pm (i.e., when a determination result is "No"), the MPU 31 shifts the process to S604.

In S603, the MPU 31 determines that the detection of a traffic lane is not possible because both of the received power representative values Pr1 and Pr2 are too small, and stores the value "none" as "lane" data in the inner table 52 related to the vehicle group to be processed. The MPU 31 then shifts the process to S609.

In S604, the MPU 31 determines whether or not the value of the received power representative value Pr1 from which the received power representative value Pr2 is subtracted is greater than the lane determination power threshold Pd. When the values of the subtraction result is determined to be greater than the threshold Pd (i.e., when a determination result is "Yes"), the MPU 31 shifts the process to S605. On the other U 31 determines whether or not the obtained values of Pr1 and Pr2 are both smaller than an effectiveness determination power determination result is "No"), the MPU 31 shifts the process to S606.

In S605, the MPU 31 determines that the vehicle group to be processed is traveling in the lane where the radar device 11*a* is installed because both the values Pr1 are significantly greater than the value Pr2, and stores the value "a" as "lane" data in the inner table 52 related to the vehicle group to be processed. The MPU 31 then shifts the process to S609.

In S606, the MPU 31 determines whether or not the value of the received power representative value Pr2 from which the received power representative value Pr1 is subtracted is greater than the lane determination power threshold Pd. When the values of the subtraction result is determined to be greater than the threshold Pd (i.e., when a determination result is "Yes"), the MPU 31 shifts the process to S607. On the other hand, when the values of the subtraction result is determined to be equal to or smaller than the threshold Pd (i.e., when a determination result is "No"), the MPU 31 shifts the process to S608.

In S607, the MPU 31 determines that the vehicle group to be processed is traveling in the lane where the radar device 11*b* is installed because both the values Pr2 are significantly greater than the value Pr1, and stores the value "b" as "lane" data in the inner table 52 related to the vehicle group to be processed. The MPU 31 then shifts the process to S609.

In S608, the MPU 31 determines that the vehicle group to be processed is traveling in the lanes where both the radar devices 11*a* and 11*b* are installed because the difference between the value Pr1 and the value Pr2 is small. As a result, the MPU 31 stores the value "a, b" as "lane" data in the inner table 52 related to the vehicle group to be processed. The MPU 31 then shifts the process to S609.

In S609, the MPU 31 determines whether or not the loop of processes between S601 and S609 should be terminated. When it is determined that the processes between S602 and S608 are performed for all the vehicle groups whose data is stored in the inner table 52, the MPU 31 terminates the loop of processes to terminate the process of detecting a lane, and then shifts the process back to the traffic lane detecting process of FIG. 5. On the other hand, when the data of a vehicle group for which the processes between S602 and S608 have not been performed is stored in the inner table 52, the MPU 31 performs the processes between S602 and S608 for that vehicle group.

The process of detecting a lane is composed of the above-described processes. FIG. 18 depicts examples of the data in the inner table 52 after the process of detecting a lane is completed, and also depicts a result of performing the process of detecting a lane in comparison with the examples of the data in FIG. 17.

Note that in the description of the examples of the data in FIG. 18, it is assumed that the effectiveness determination power threshold Pm is 5 [dBmV], and the lane determination power threshold Pd is 10 [dBmV].

In the example of FIG. 18, when the vehicle group "ID" data is, for example, "ID1", then the received power representative value Pr1 is "20", and the received power representative value Pr2 is also "20". In this case, the results of the determination in S602, S604, and S606 of FIG. 16 all become "No", and thus the "lane" data becomes "a,b".

When the vehicle group "ID" data is, for example, "ID2", then the received power representative value Pr1 is "20", and the received power representative value Pr2 is "2". In this case, the result of the determination in S602 of FIG. 16 is "No", but the result of the determination in S604 is "Yes". Thus, the "lane" data becomes "a".

When the vehicle group "ID" data is, for example, "ID3", then the received power representative value Pr1 is "2", and the received power representative value Pr2 is also "2". In this case, the result of the determination in S602 of FIG. 16 is "Yes", and thus the "lane" data becomes "none".

By so doing, a result of performing the process of detecting a lane is stored in the inner table 52. In the process of outputting a determination result which will be performed afterward, as in S109 of FIG. 5, the MPU 31 extracts from the inner table 52 the data of the existing position of a vehicle group and the speed of the vehicle group with respect to each of the lanes 2*a* and 2*b*, and outputs the extracted data to other devices. FIG. 19 depicts an example of the output data from a traffic lane detection apparatus.

By operating as described above, it becomes possible for the traffic lane detection apparatus 10 to appropriately detect the traffic lane of a vehicle to be detected by using the detection technique of either the forward detection or backward detection.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus which detects a traffic lane, the apparatus comprising:
   a plurality of radar devices provided for each lane, whose detection range includes an installed lane and an adjacent lane adjacent to the installed lane, the radar devices detecting a vehicle by emitting a radar wave to the vehicle traveling in the lane and by receiving a reflected wave from the vehicle;
   a memory configured to sequentially store as a received power value an instantaneous value of a received power at a time when two radar devices installed for adjacent lanes out of the plurality of radar devices receive the reflected wave from a vehicle to be detected at specified time intervals;
   a calculator configured to calculate, when the vehicle to be detected moves in a direction approaching the radar devices, as a representative value of a received power at a specified time in regard to each of the two radar devices, a weighted average value of the received power value when inverse weights, which become heavier as an acquisition time of the received power value becomes farther from the specified time, are assigned to a specified number of received power values stored in the memory according to a time at which the received power value is obtained, where an acquisition time of the received power values is prior to the specified time and a priority is given to the received power values whose acquisition time is close to the specified time; and
   a discriminator configured to compare sizes of representative values of the received power calculated by the calculator between the two radar devices, and determine a lane in which the vehicle to be detected is traveling according to the comparison result.

2. The apparatus according to claim 1, wherein
   when the vehicle to be detected is traveling in a direction moving away from the radar device, the calculator calculates, as a representative value of the received power at the specified time, a weighted average value of the received power value when normal weights, which become heavier as an acquisition time of the received power value becomes closer to the specified time, are assigned to a specified number of received power values stored in the memory according to a time at which the received power value is obtained, where an acquisition time of the received power values is prior to the specified time and a priority is given to the received power values whose acquisition time is close to the specified time.

3. The apparatus according to claim 2, wherein
   the calculator uses identical weights to a specified number of weights assigned to a specified number of received power values in the normal weighting for a specified number of weights assigned to a specified number of received power values in the inverse weighting.

4. The apparatus according to claim 2, wherein
   the radar devices output as a detection result moving direction information that indicates whether a moving direction of the detected vehicle is a direction approaching the radar devices or a direction moving away from the radar devices, and
   the calculator determines whether the inverse weighting or the normal weighting should be used to calculate a representative value of the received power, according to the moving direction information.

5. The apparatus according to claim 1, wherein
   the radar device outputs as a detection result a distance between the detected vehicle and the radar device, and
   the apparatus further comprises a determiner configured to determine the specified number of received power values, which is used by the calculator to calculate a representative value of the received power at the specified time, according to a distance at the specified time between the vehicle to be detected and the radar device.

6. A method for detecting a traffic lane, the method comprising:
   sequentially obtaining and storing in a memory as a received power value an instantaneous value of a received power at a time when two radar devices installed for adjacent lanes out of a plurality of radar devices, which are provided for each lane and whose detection range includes an installed lane and an adjacent lane adjacent to the installed lane, receive the reflected wave from a vehicle to be detected at specified time intervals, the radar devices detecting the vehicle by emitting a radar wave to the vehicle traveling in the lane and by receiving a reflected wave from the vehicle;

calculating, when the vehicle to be detected moves in a direction approaching the radar devices, as a representative value of a received power at a specified time in regard to each of the two radar devices, a weighted average value of the received power value when inverse weights, which become heavier as an acquisition time of the received power value becomes farther from the specified time, are assigned to a specified number of received power values stored in the memory according to a time at which the received power value is obtained, where an acquisition time of received power values is prior to the specified time and a priority is given to the received power values whose acquisition time is close to the specified time; and comparing sizes of the calculated representative values of the received power between the two radar devices, and determining a lane in which the vehicle to be detected is traveling according to the comparison result.

7. The method according to claim 6, wherein
when the vehicle to be detected is traveling in a direction moving away from the radar device, as a representative value of the received power at the specified time, in calculation of a representative value of the received power at the specified time, a weighted average value of the received power value when normal weights, which become heavier as an acquisition time of the received power value becomes closer to the specified time, are assigned to a specified number of received power values stored in the memory according to a time at which the received power value is obtained, where an acquisition time of the received power values is prior to the specified time and a priority is given to the received power values whose acquisition time is close to the specified time, is calculated.

8. The method according to claim 7, wherein
in calculation of a representative value of the received power at the specified time, identical weights to a specified number of weights assigned to a specified number of received power values in the normal weighting are used for a specified number of weights assigned to a specified number of received power values in the inverse weighting.

9. The method according to claim 7, wherein:
the radar devices output as a detection result moving direction information that indicates whether a moving direction of the detected vehicle is a direction approaching the radar devices or a direction moving away from the radar devices, and
in calculation of a representative value of the received power at the specified time, whether the inverse weighting or the normal weighting should be used to calculate a representative value of the received power is determined according to the moving direction information.

10. The method according to claim 6, wherein:
the radar device outputs as a detection result a distance between the detected vehicle and the radar device, and
the method further comprises determining the specified number of received power values, which is used for calculating a representative value of the received power at the specified time, according to a distance at the specified time between the vehicle to be detected and the radar device.

11. A non-transitory computer-readable recording medium having stored therein a program for causing a computer to execute a process for detecting a traffic lane, the process comprising:
sequentially obtaining and storing in a memory as a received power value an instantaneous value of a received power at a time when two radar devices installed for adjacent lanes out of a plurality of radar devices, which are provided for each lane and whose detection range includes an installed lane and an adjacent lane adjacent to the installed lane, receive the reflected wave from a vehicle to be detected at specified time intervals, the radar devices detecting the vehicle by emitting a radar wave to the vehicle traveling in the lane and by receiving a reflected wave from the vehicle;
calculating, when the vehicle to be detected moves in a direction approaching the radar devices, as a representative value of a received power at a specified time in regard to each of the two radar devices, a weighted average value of the received power value when inverse weights, which become heavier as an acquisition time of the received power value becomes farther from the specified time, are assigned to a specified number of received power values stored in the memory according to a time at which the received power value is obtained, where an acquisition time is prior to the specified time and a priority is given to the received power values whose acquisition time is close to the specified time; and
comparing sizes of the calculated representative values of the received power between the two radar devices, and determining a lane in which the vehicle to be detected is traveling according to the comparison result.

12. The non-transitory computer-readable recording medium according to claim 11, wherein
when the vehicle to be detected is traveling in a direction moving away from the radar device, as a representative value of the received power at the specified time, in calculation of a representative value of the received power at the specified time, a weighted average value of the received power value when normal weights, which become heavier as an acquisition time of the received power value becomes closer to the specified time, are assigned to a specified number of received power values stored in the memory according to a time at which the received power value is obtained, where an acquisition time of the received power values is prior to the specified time and a priority is given to the received power values whose acquisition time is close to the specified time, is calculated.

13. The non-transitory computer-readable recording medium according to claim 12, wherein
in calculation of a representative value of the received power at the specified time, identical weights to a specified number of weights assigned to a specified number of received power values in the normal weighting are used for a specified number of weights assigned to a specified number of received power values in the inverse weighting.

14. The non-transitory computer-readable recording medium according to claim 12, wherein
when the radar devices output as a detection result moving direction information that indicates whether a moving direction of the detected vehicle is a direction approaching the radar devices or a direction moving away from the radar devices, in calculation of a representative value of the received power at the specified time, whether the inverse weighting or the normal weighting should be used to calculate a representative value of the received power is determined according to the moving direction information.

15. The non-transitory computer-readable recording medium according to claim 11, the process further comprising:

when the radar device outputs as a detection result a distance between the detected vehicle and the radar device, determining the specified number of received power values, which is used for calculating a representative value of the received power at the specified time, according to a distance at the specified time between the vehicle to be detected and the radar device.

* * * * *